(12) United States Patent
Van der Auwera et al.

(10) Patent No.: US 11,128,872 B2
(45) Date of Patent: *Sep. 21, 2021

(54) POSITION DEPENDENT INTRA PREDICTION COMBINATION WITH WIDE ANGLE INTRA PREDICTION

(71) Applicant: QUALCOMM Incorporated, San Diego, CA (US)

(72) Inventors: Geert Van der Auwera, Del Mar, CA (US); Adarsh Krishnan Ramasubramonian, Irvine, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/510,863

(22) Filed: Jul. 12, 2019

(65) Prior Publication Data

US 2020/0021817 A1 Jan. 16, 2020

Related U.S. Application Data

(60) Provisional application No. 62/698,804, filed on Jul. 16, 2018.

(51) Int. Cl.
*H04N 19/159* (2014.01)
*H04N 19/52* (2014.01)
(Continued)

(52) U.S. Cl.
CPC ......... *H04N 19/159* (2014.11); *H04N 19/105* (2014.11); *H04N 19/11* (2014.11);
(Continued)

(58) Field of Classification Search
CPC .... H04N 19/105; H04N 19/11; H04N 19/119; H04N 19/159; H04N 19/167;
(Continued)

(56) References Cited

U.S. PATENT DOCUMENTS 10,404,980 B1 * 9/2019 Zhao ................... H04N 19/176
10,419,754 B1 * 9/2019 Zhao ................... H04N 19/11
(Continued)

FOREIGN PATENT DOCUMENTS

WO 2017058635 A1 4/2017
WO 2017165395 A1 9/2017
(Continued)

OTHER PUBLICATIONS

Zhao et al. "CE3-related: Wide-angle intra prediction for non-square blocks" (JVET-K0500_r3), Jul. 15, 2018 (Year: 2018).*
(Continued)

*Primary Examiner* — James T Boylan
(74) *Attorney, Agent, or Firm* — Polsinelli LLP

(57) ABSTRACT

Techniques are described using Position Dependent Intra Prediction Combination (PDPC) with wide angle intra prediction. For example, a size of the current block of video data can be determined. Based on the size, a wide angle intra-prediction mode can be determined for the current block. A prediction block for the current block can be determined using the wide angle intra-prediction mode. A prediction sample from the prediction block can be modified to generate a modified prediction sample using PDPC, which can include determining one or more reference samples that are external to the current block based on the wide angle intra-prediction mode, and modifying the prediction sample to generate the modified prediction sample based on the determined one or more reference samples.

67 Claims, 12 Drawing Sheets

(51) Int. Cl.
*H04N 19/105* (2014.01)
*H04N 19/96* (2014.01)
*H04N 19/593* (2014.01)
*H04N 19/176* (2014.01)
*H04N 19/11* (2014.01)

(52) U.S. Cl.
CPC .......... *H04N 19/176* (2014.11); *H04N 19/52* (2014.11); *H04N 19/593* (2014.11); *H04N 19/96* (2014.11)

(58) Field of Classification Search
CPC .... H04N 19/176; H04N 19/52; H04N 19/593; H04N 19/96
See application file for complete search history.

(56) References Cited

U.S. PATENT DOCUMENTS

| | | | | |
|---|---|---|---|---|
| 10,491,893 | B1* | 11/2019 | Zhao | H04N 19/117 |
| 10,652,537 | B1* | 5/2020 | Sun | H04N 19/186 |
| 2017/0094285 | A1* | 3/2017 | Said | H04N 19/157 |
| 2017/0272759 | A1* | 9/2017 | Seregin | H04N 19/136 |
| 2018/0176587 | A1* | 6/2018 | Panusopone | H04N 19/174 |
| 2019/0089952 | A1* | 3/2019 | Liu | H04N 19/46 |
| 2019/0166370 | A1* | 5/2019 | Xiu | H04N 19/176 |
| 2019/0306513 | A1* | 10/2019 | Van der Auwera | H04N 19/176 |
| 2020/0007870 | A1* | 1/2020 | Ramasubramonian | H04N 19/174 |
| 2020/0021817 | A1* | 1/2020 | Van der Auwera | H04N 19/52 |
| 2020/0045326 | A1* | 2/2020 | Zhao | H04N 19/44 |
| 2020/0099928 | A1* | 3/2020 | Piao | H04N 19/105 |
| 2020/0120358 | A1* | 4/2020 | Poirier | H04N 19/176 |
| 2020/0154100 | A1* | 5/2020 | Zhao | H04N 19/159 |
| 2020/0154114 | A1* | 5/2020 | Zhao | H04N 19/159 |
| 2020/0162728 | A1* | 5/2020 | Van der Auwera | H04N 19/105 |
| 2020/0162733 | A1* | 5/2020 | Sun | H04N 19/159 |
| 2020/0162737 | A1* | 5/2020 | Van der Auwera | H04N 19/109 |
| 2020/0195921 | A1* | 6/2020 | Van der Auwera | H04N 19/176 |
| 2020/0304832 | A1* | 9/2020 | Ramasubramonian | H04N 19/70 |
| 2020/0404325 | A1* | 12/2020 | Ramasubramonian | H04N 19/176 |

FOREIGN PATENT DOCUMENTS

| | | |
|---|---|---|
| WO | 2017192995 A1 | 11/2017 |
| WO | 2018127624 A1 | 7/2018 |
| WO | 2018202558 A1 | 11/2018 |
| WO | 2019147087 A1 | 8/2019 |

OTHER PUBLICATIONS

Van Der Auwera et al. "Extension of Simplified PDPC to Diagonal Intra Modes" (JVET-J0069) Apr. 3, 2018 (Year: 2018).*

Heo (LGE) J., et al., "CE3-4.1: Harmonization of Linear Interpolation Intra prediction (LIP) with Simplified Position Dependent Intra Prediction Combination (PDPC) and Wide-Angle Intra Prediction (WAIP)", 124th MPEG Meeting; Oct. 8, 2018-Oct. 12, 2018; Macao; (Motion Picture Expert Group or ISO/IEC JTC1/SC29/WG11), No. m44140, Sep. 24, 2018, XP030190822, Retrieved from the Internet: URL:http://phenix.int-evry.fr/mpeg/doc_end_user/documents/124_Macao/wg11/m44140-JVET-L0131-v1-JVET-L0131_v1.zip [retrieved-on Sep. 24, 2018] Section 1 Proposed Method figure 1, 4 pages.

International Search Report and Written Opinion—PCT/US2019/041853—ISA/EPO—dated Oct. 23, 2019.

Zhao X., et al., "EE1 Related: Simplification and Extension of PDPC", 8th JVET Meeting; Oct. 18, 2017-Oct. 25, 2017; Macau; (The Joint Video Exploration Team of ISO/IEC JTC1/SC29/WG11 and ITU-T SG.16); URL: http://phenix.int-evry.fr/jvet/,,No. JVET—H0057-r1, Oct. 11, 2017, XP030151049, Section 1 Proposed method, 4 pages.

* cited by examiner

POSITION DEPENDENT INTRA PREDICTION COMBINATION WITH WIDE ANGLE INTRA PREDICTION

CROSS-REFERENCE TO RELATED APPLICATIONS

This application claims the benefit of U.S. Provisional Application No. 62/698,804, filed Jul. 16, 2018, which is hereby incorporated by reference, in its entirety and for all purposes.

FIELD

This application is related to video encoding and decoding. In some cases, systems, apparatuses, methods, and computer-readable media are described for performing position dependent intra prediction combination (PDPC) with wide angle intra prediction.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Such devices allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Digital video devices can implement video coding techniques to compress video data. Video coding is performed according to one or more video coding standards. For example, video coding standards include versatile video coding (VVC), high-efficiency video coding (HEVC), advanced video coding (AVC), MPEG-2 Part 2 coding (MPEG stands for moving picture experts group), among others. Video coding generally utilizes prediction methods (e.g., inter prediction, intra prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

SUMMARY

Techniques and systems are described herein for performing position dependent intra prediction combination (PDPC) with wide-angle modes for intra prediction. Using intra prediction, a coding device (e.g., a video encoder and/or video decoder) can form a prediction block using spatial prediction techniques based on neighboring samples from previously-encoded neighboring blocks within the same picture. The neighboring samples can be identified based on a particular intra-prediction mode being used, such as a Planar mode, a DC mode, and/or one of multiple directional prediction modes (vertical, horizontal, and various angular modes). The directional prediction modes typically use directions (or angles) between approximately −135 degrees to approximately 45 degrees relative to a vertical direction from a prediction sample.

In efficient video encoders and/or decoders, the block structure used for specifying the prediction block for intra prediction is not restricted to be square (a block is square when width (w)=height (h)). Using rectangular prediction blocks (w>h or w<h) can increase the coding efficiency based on the characteristics of the content. In such rectangular blocks, restricting the direction of intra prediction to be within −135 degrees to 45 degrees can result in situations where reference samples that are further from a prediction sample (a sample being predicted) are used for intra prediction rather than closer reference samples. Such a design is likely to have a negative impact in coding efficiency. It would be more beneficial to have the range of restrictions relaxed so that closer reference samples (e.g., beyond the −135 to 45 degree angles) can be used for intra prediction. For example, directional prediction modes that use directions (or angles) that are less than −135 degrees or greater than 45 degrees (referred to as "wide-angle modes") relative to a vertical direction from a prediction sample.

PDPC can be used to modify prediction samples determined using intra prediction. For instance, using PDPC, a coding device (e.g., a video encoder and/or video decoder) can determine reference samples that are present in one or more lines above and/or to the left of the current block, and can use the reference samples to modify the prediction samples determined using intra prediction. The modified prediction samples can then be used to encode or decode the current block.

The techniques and systems described herein provide ways to perform PDPC when wide angle intra-prediction modes are used. Techniques are also described for signaling and/or decoding associated information. In some cases, for encoding, a video encoder can use the modified prediction samples to determine residual values that are signaled to a video decoder. In some cases, for decoding, a video decoder can add the modified prediction samples to the received residual values to reconstruct the current block.

According to at least one example, a method of decoding video data is provided. The method includes obtaining a current block of video data, and determining a size of the current block. The method further includes determining, based on the size of the current block, a wide angle intra-prediction mode to use for the current block. The method further includes determining a prediction block for the current block using the wide angle intra-prediction mode. The prediction block includes a plurality of prediction samples. The method further includes modifying a prediction sample of the plurality of prediction samples of the prediction block to generate a modified prediction sample using Position Dependent Intra Prediction Combination (PDPC). Modifying the prediction sample comprises: determining one or more reference samples that are external to the current block based on the wide angle intra-prediction mode; and modifying the prediction sample to generate the modified prediction sample based on the determined one or more reference samples. The method further includes reconstructing a sample of the current block based on the modified prediction sample and a residual value.

In another example, a device for decoding video data is provided that includes a memory configured to store one or more prediction blocks, and a video decoder comprising at least one of fixed-function or programmable circuitry. In some examples, the video decoder is configured to obtain a current block of video data, and to determine a size of the current block. The video decoder is further configured to determine, based on the size of the current block, a wide angle intra-prediction mode to use for the current block. The video decoder is further configured to determine a prediction block for the current block using the wide angle intra-prediction mode. The prediction block includes a plurality of prediction samples. The video decoder is further configured to modify a prediction sample of the plurality of prediction samples of the prediction block to generate a modified prediction sample using Position Dependent Intra Prediction Combination (PDPC). Modifying the prediction sample comprises: determining one or more reference samples that are external to the current block based on the wide angle intra-prediction mode; and modifying the prediction sample to generate the modified prediction sample based on the determined one or more reference samples. The video decoder is further configured to reconstruct a sample of the current block based on the modified prediction sample and a residual value.

In another example, a computer-readable storage medium storing instructions that when executed cause one or more processors of a device for decoding video data to: obtain a current block of video data; determine a size of the current block; determine, based on the size of the current block, a wide angle intra-prediction mode to use for the current block; determine a prediction block for the current block using the wide angle intra-prediction mode, the prediction block including a plurality of prediction samples; modify a prediction sample of the plurality of prediction samples of the prediction block to generate a modified prediction sample using Position Dependent Intra Prediction Combination (PDPC), wherein modifying the prediction sample comprises: determining one or more reference samples that are external to the current block based on the wide angle intra-prediction mode; and modifying the prediction sample to generate the modified prediction sample based on the determined one or more reference samples; and reconstruct a sample of the current block based on the modified prediction sample and a residual value.

In another example, a device for decoding video data is provided. The device includes means for obtaining a current block of video data, and means for determining a size of the current block. The device further includes means for determining, based on the size of the current block, a wide angle intra-prediction mode to use for the current block. The device further includes means for determining a prediction block for the current block using the wide angle intra-prediction mode. The prediction block includes a plurality of prediction samples. The device further includes means for modifying a prediction sample of the plurality of prediction samples of the prediction block to generate a modified prediction sample using Position Dependent Intra Prediction Combination (PDPC). Modifying the prediction sample comprises: determining one or more reference samples that are external to the current block based on the wide angle intra-prediction mode; and modifying the prediction sample to generate the modified prediction sample based on the determined one or more reference samples. The device further includes means for reconstructing a sample of the current block based on the modified prediction sample and a residual value.

In another example, a method of encoding video data is provided. The method includes obtaining a current block of video data, and determining a size of the current block. The method further includes determining, based on the size of the current block, a wide angle intra-prediction mode to use for the current block. The method further includes determining a prediction block for the current block using the wide angle intra-prediction mode. The prediction block includes a plurality of prediction samples. The method further includes modifying a prediction sample of the plurality of prediction samples of the prediction block to generate a modified prediction sample using Position Dependent Intra Prediction Combination (PDPC). Modifying the prediction sample comprises: determining one or more reference samples that are external to the current block based on the wide angle intra-prediction mode; and modifying the prediction sample to generate the modified prediction sample based on the determined one or more reference samples. The method further includes determining a residual value for a residual block based on the modified prediction sample and a sample value in the current block, and signaling information indicative of the residual value.

In another example, a device for encoding video data is provided that includes a memory configured to store one or more prediction blocks, and a video encoder comprising at least one of fixed-function or programmable circuitry. In some examples, the video encoder is configured to obtain a current block of video data, and to determine a size of the current block. The video encoder is further configured to determine, based on the size of the current block, a wide angle intra-prediction mode to use for the current block. The video encoder is further configured to determine a prediction block for the current block using the wide angle intra-prediction mode. The prediction block includes a plurality of prediction samples. The video encoder is further configured to modify a prediction sample of the plurality of prediction samples of the prediction block to generate a modified prediction sample using Position Dependent Intra Prediction Combination (PDPC). Modifying the prediction sample comprises: determining one or more reference samples that are external to the current block based on the wide angle intra-prediction mode; and modifying the prediction sample to generate the modified prediction sample based on the determined one or more reference samples. The video encoder is further configured to determine a residual value for a residual block based on the modified prediction sample and a sample value in the current block. The video encoder is further configured to signal information indicative of the residual value.

In another example, a computer-readable storage medium storing instructions that when executed cause one or more processors of a device for encoding video data to: obtain a current block of video data; determine a size of the current block; determine, based on the size of the current block, a wide angle intra-prediction mode to use for the current block; determine a prediction block for the current block using the wide angle intra-prediction mode, the prediction block including a plurality of prediction samples; modify a prediction sample of the plurality of prediction samples of the prediction block to generate a modified prediction sample using Position Dependent Intra Prediction Combination (PDPC), wherein modifying the prediction sample comprises: determining one or more reference samples that are external to the current block based on the wide angle intra-prediction mode; and modifying the prediction sample to generate the modified prediction sample based on the determined one or more reference samples; determining a residual value for a residual block based on the modified prediction sample and a sample value in the current block; and signaling information indicative of the residual value.

In another example, a device for encoding video data is provided. The device includes means for obtaining a current block of video data, and means for determining a size of the current block. The device further includes means for determining, based on the size of the current block, a wide angle intra-prediction mode to use for the current block. The device further includes means for determining a prediction block for the current block using the wide angle intra-prediction mode. The prediction block includes a plurality of prediction samples. The device further includes means for modifying a prediction sample of the plurality of prediction samples of the prediction block to generate a modified prediction sample using Position Dependent Intra Prediction Combination (PDPC). Modifying the prediction sample comprises: determining one or more reference samples that are external to the current block based on the wide angle intra-prediction mode; and modifying the prediction sample to generate the modified prediction sample based on the determined one or more reference samples. The device further includes means for determining a residual value for a residual block based on the modified prediction sample and a sample value in the current block. The device further includes means for signaling information indicative of the residual value.

In some aspects, determining the size of the current block includes determining a width of the block and a height of the block are different sizes.

In some aspects, the one or more reference samples that are external to the current block are determined using an angle of the wide angle intra-prediction mode relative to the prediction sample. In some examples, the angle of the wide angle intra-prediction mode is less than −135 degrees or greater than to 45 degrees relative to the prediction sample.

In some aspects, the methods, devices, and computer-readable media described above can comprise determining one or more weights based on x- and y-coordinates of the prediction sample. In such aspects, modifying the prediction sample comprises modifying the prediction sample to generate the modified prediction sample based on the determined one or more reference samples, the determined one or more weights, and the prediction sample.

In some aspects, determining the one or more reference samples that are external to the current block comprises determining the one or more reference samples having both an x-coordinate and a y-coordinate that are different than both a respective x-coordinate and y-coordinate of the prediction sample in the prediction block.

In some aspects, determining the one or more reference samples that are external to the current block comprises: determining a row that is above the current block; determining an x-coordinate in the determined row, wherein the x-coordinate in the determined row is equal to an x-coordinate of the prediction sample plus a y-coordinate of the prediction sample plus 1; and determining a reference sample of the one or more reference samples based on the determined row and the determined x-coordinate.

In some aspects, determining the one or more reference samples that are external to the current block comprises: determining a column that is left of the current block; determining a y-coordinate in the determined column, wherein the y-coordinate in the determined column is equal to a y-coordinate of the prediction sample plus an x-coordinate of the prediction sample plus 1; and determining a reference sample of the one or more reference samples based on the determined column and the determined y-coordinate.

In some aspects, determining the one or more reference samples that are external to the current block comprises: determining a row that is above the current block; determining an x-coordinate in the determined row, wherein the x-coordinate in the determined row is based on an angle of the wide angle intra-prediction mode relative to the prediction sample; and determining a reference sample of the one or more reference samples based on the determined row and the determined x-coordinate. In some cases, determining the x-coordinate in the determined row comprises: determining one of a cotangent or tangent of the angle of the wide angle intra-prediction mode; and determining the x-coordinate in the determined row based on one of the cotangent or tangent of the angle of the wide angle intra-prediction mode, an x-coordinate of the prediction sample, and a y-coordinate of the prediction sample.

In some aspects, determining the one or more reference samples that are external to the current block comprises: determining a column that is left of the current block; determining a y-coordinate in the determined column, wherein the y-coordinate in the determined column is based on an angle of the wide angle intra-prediction mode; and determining a reference sample of the one or more reference samples based on the determined column and the determined y-coordinate. In some cases, determining the y-coordinate in the determined column comprises: determining one of a cotangent or tangent of the angle of the wide angle intra-prediction mode; and determining the y-coordinate in the determined column based on one of the cotangent or tangent of the angle of the wide angle intra-prediction mode, an x-coordinate of the prediction sample, and a y-coordinate of the prediction sample.

In some aspects, determining the one or more reference samples that are external to the current block based on the wide angle intra-prediction mode comprises: determining a set of one or more samples based on the wide angle intra-prediction mode; and at least one of interpolating, rounding with offset, or rounding without offset the set of one or more samples to generate the one or more reference samples.

In some aspects, determining the one or more reference samples that are external to the current block based on the wide angle intra-prediction mode comprises: determining that one or more samples external to the current block identified based on the wide angle intra-prediction mode are not stored in a reference line buffer; and determining the one or more reference samples based on a last reference sample stored in the reference line buffer.

In some aspects, modifying the prediction sample of the plurality of prediction samples of the prediction block comprises modifying a first prediction sample of the prediction block. In such aspects, the one or more reference samples comprise a first set of one or more reference samples. In such aspects, the methods, devices, and computer-readable media described above can comprise: determining, for a second prediction sample of the prediction block, that at least one reference sample of a second set of one or more reference samples for the second prediction sample are not stored in a reference line buffer; and one of not applying PDPC to the second prediction sample or applying PDPC using only reference samples available in reference line buffer.

In some aspects, the wide angle intra-prediction mode is not a DC, planar, horizontal, or vertical intra-prediction mode.

In some aspects, the device for decoding video data comprises a display configured to display the current block. In some aspects, the device for decoding video comprises one or more of a camera, a computer, a mobile device, a broadcast receiver device, or a set-top box.

In some aspects, the device for encoding video data comprises a display configured to display the current block. In some aspects, the device for encoding video comprises one or more of a camera, a computer, a mobile device, a broadcast receiver device, or a set-top box.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
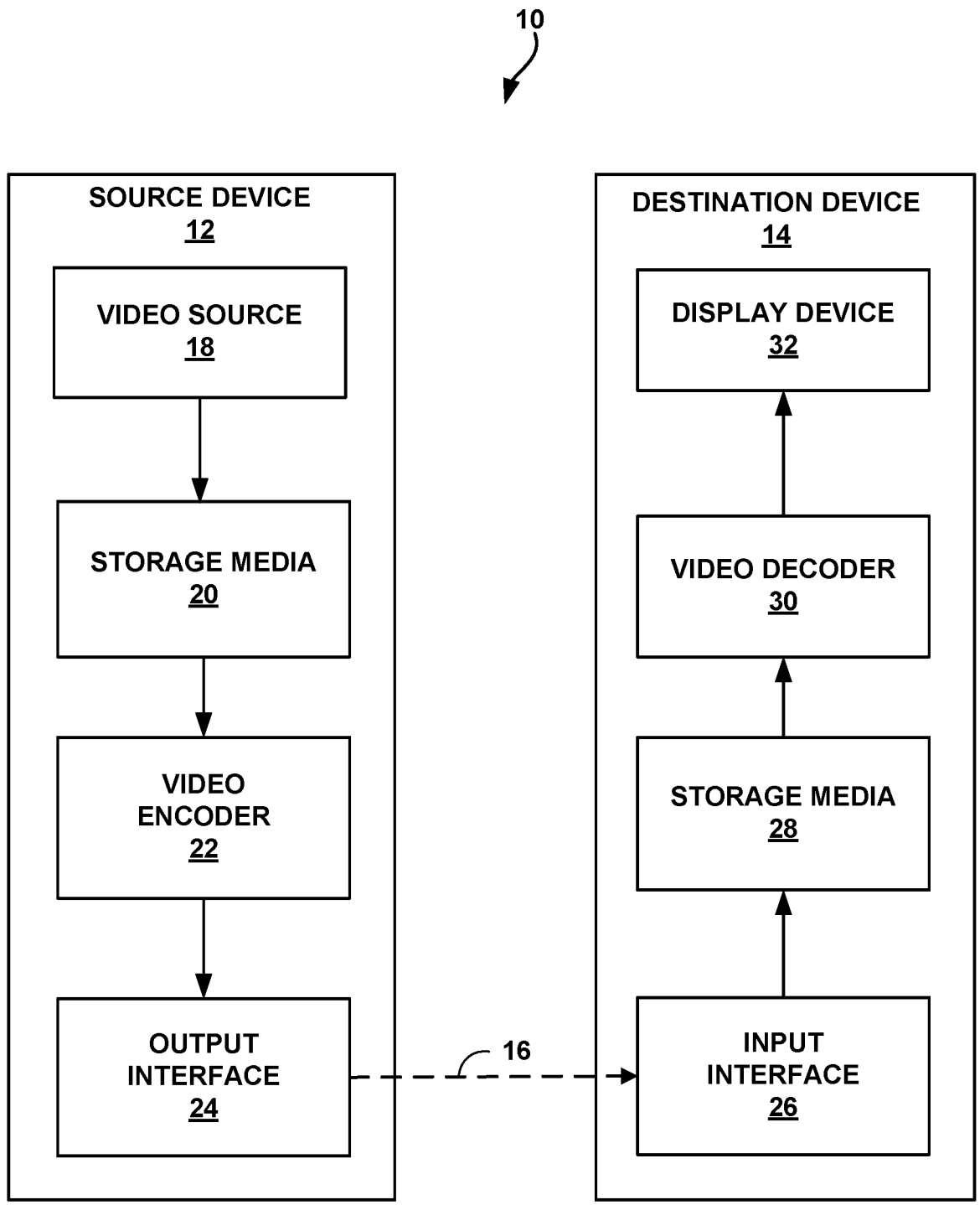
FIG. 1 is a block diagram illustrating an example video encoding and decoding system configured to implement techniques of the disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Video coding devices (also referred to as video coders) implement video compression techniques to encode and decode video data efficiently. Video compression techniques may include applying different prediction modes, including spatial prediction (e.g., intra-frame prediction or intra prediction), temporal prediction (e.g., inter-frame prediction or inter prediction), inter-layer prediction (across different layers of video data, and/or other prediction techniques to reduce or remove redundancy inherent in video sequences. A video encoder can partition each picture of an original video sequence into rectangular regions referred to as video blocks or coding units (described in greater detail below). These video blocks may be encoded using a particular prediction mode.

Video blocks may be divided in one or more ways into one or more groups of smaller blocks. Blocks can include coding tree blocks, prediction blocks, transform blocks, and/or other suitable blocks. References generally to a "block," unless otherwise specified, may refer to such video blocks (e.g., coding tree blocks, coding blocks, prediction blocks, transform blocks, or other appropriate blocks or sub-blocks, as would be understood by one of ordinary skill). Further, each of these blocks may also interchangeably be referred to herein as "units" (e.g., coding tree unit (CTU), coding unit, prediction unit (PU), transform unit (TU), or the like). In some cases, a unit may indicate a coding logical unit that is encoded in a bitstream, while a block may indicate a portion of video frame buffer a process is target to.

For inter-prediction modes, a video encoder can search for a block similar to the block being encoded in a frame (or picture) located in another temporal location, referred to as a reference frame or a reference picture. The video encoder may restrict the search to a certain spatial displacement from the block to be encoded. A best match may be located using a two-dimensional (2D) motion vector that includes a horizontal displacement component and a vertical displacement component. For intra-prediction modes, a video encoder may form the predicted block using spatial prediction techniques based on data from previously encoded neighboring blocks within the same picture.

The video encoder may determine a prediction error. For example, the prediction can be determined as the difference between the pixel values (or sample values) in the block being encoded and the predicted block. The prediction error can also be referred to as the residual. The video encoder may also apply a transform to the prediction error (e.g., a discrete cosine transform (DCT) or other suitable transform) to generate transform coefficients. After transformation, the video encoder may quantize the transform coefficients. The quantized transform coefficients and motion vectors may be represented using syntax elements, and, along with control information, form a coded representation of a video sequence. In some instances, the video encoder may entropy code syntax elements, thereby further reducing the number of bits needed for their representation.

A video decoder may, using the syntax elements and control information discussed above, construct predictive data (e.g., a predictive block) for decoding a current frame. For example, the video decoder may add the predicted block and the compressed prediction error. The video decoder may determine the compressed prediction error by weighting the transform basis functions using the quantized coefficients. The difference between the reconstructed frame and the original frame is called reconstruction error.

This disclosure describes systems and techniques for coding one or more samples and/or blocks of video data using intra prediction and Position Dependent (Intra) Prediction Combination (PDPC). For example, a wide angle intra-prediction mode can be performed to generate a prediction block of prediction samples. Wide angle intra-prediction modes use angles outside of the standard angles of −135 degrees (intra-prediction mode 2) to 45 degrees (intra-prediction mode 66), and can use angles that are less than −135 degrees and/or angles that are greater than 45 degrees relative to a vertical direction from the prediction sample. The systems and techniques provided herein extend the use of PDPC to such wide angle intra-prediction modes in order to determine reference samples that are used to modify the prediction samples of the prediction block.

The systems and techniques described herein introduce an enhancement in compression efficiency generally in coding a sample and/or block of video data. For example, compression efficiency is provided by performing a PDPC approach that uses wide-angle modes, due in part to reference samples that are closer to a prediction sample being used for PDPC. Compression efficiency is a generally desirable goal in advancing the state of existing video coding techniques.

As used in this disclosure, the term video coding generically refers to either video encoding or video decoding. Similarly, the term video coder may generically refer to a video encoder, a video decoder, or a combined video encoder-decoder (CODEC). Moreover, certain techniques described in this disclosure with respect to video decoding may also apply to video encoding, and vice versa. For example, video encoders and video decoders can be configured to perform the same process, or reciprocal processes. Also, video encoders typically perform video decoding as part of the processes of determining how to encode video data. Thus, unless stated to the contrary, it should not be assumed that a technique described with respect to video decoding cannot also be performed as part of video encoding, or vice versa.

This disclosure may also use terms such as current layer, current block, current picture, current slice, etc. In the context of this disclosure, the term current is intended to identify a block, picture, slice, etc. that is currently being coded, as opposed to, for example, previously or already coded blocks, pictures, and slices or yet to be coded blocks, pictures, and slices.

The techniques described herein can be applied to any of the existing video codecs (e.g., High Efficiency Video Coding (HEVC), Advanced Video Coding (AVC), or other suitable existing video codec), and/or can be an efficient coding tool for any video coding standards being developed and/or future video coding standards, such as, for example, Versatile Video Coding (VVC), the joint exploration model (JEM), and/or other video coding standard in development or to be developed. While examples are provided herein using video coding for illustrative purposes, in some cases, the techniques described herein can be performed using any coding device, such as an image coder (e.g., a JPEG encoder and/or decoder, or the like), a video coder (e.g., a video encoder and/or video decoder), or other suitable coding device.

FIG. 1 is a block diagram illustrating an example video encoding and decoding system 10 that may utilize techniques of this disclosure for coding one or more samples and/or blocks of video data. In some examples, the video encoding and decoding system 10 can code the video data using a PDPC approach when multiple reference lines are used for generating intra-coded prediction samples and/or for generating PDPC reference samples used for modifying the intra-coded prediction samples. The MRL mode includes using multiple reference lines that are in the neighborhood of the current block.

As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, televisions, cameras, display devices, digital media players, video gaming consoles, video streaming device, or the like. In some cases, source device 12 and destination device 14 may be equipped for wireless communication. Thus, source device 12 and destination device 14 may be wireless communication devices. Source device 12 is an example video encoding device (i.e., a device for encoding video data). Destination device 14 is an example video decoding device (e.g., a device or apparatus for decoding video data).

In the example of FIG. 1, source device 12 includes a video source 18, a storage media 20 configured to store video data, a video encoder 22, and an output interface 24. Destination device 14 includes an input interface 26, storage media 28 configured to store encoded video data, a video decoder 30, and display device 32. In other examples, source device 12 and destination device 14 include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Techniques for processing video data may be performed by any digital video encoding and/or decoding device or apparatus. Although generally the techniques of this disclosure are performed by a video encoding device and a video decoding device, the techniques may also be performed by a combined video encoder/decoder, typically referred to as a "CODEC." Source device 12 and destination device 14 are merely examples of such coding devices in which source device 12 generates encoded video data for transmission to destination device 14. In some examples, source device 12 and destination device 14 operate in a substantially symmetrical manner such that each of source device 12 and destination device 14 includes video encoding and decoding components. Hence, system 10 may support one-way or two-way video transmission between source device 12 and destination device 14, e.g., for video streaming, video playback, video broadcasting, or video telephony.

Video source 18 of source device 12 may include a video capture device, such as a video camera, a video archive containing previously captured video, and/or a video feed interface to receive video data from a video content provider. As a further alternative, video source 18 may generate computer graphics-based data as the source video, or a combination of live video, archived video, and computer-generated video. Source device 12 may comprise one or more data storage media (e.g., storage media 20) configured to store the video data. The techniques described in this disclosure may be applicable to video coding in general, and may be applied to wireless and/or wired applications. In each case, the captured, pre-captured, or computer-generated video may be encoded by video encoder 22. Output interface 24 may output the encoded video information to computer-readable medium 16.

Destination device 14 may receive the encoded video data to be decoded via computer-readable medium 16. Computer-readable medium 16 may comprise any type of medium or device capable of moving the encoded video data from source device 12 to destination device 14. In some examples, computer-readable medium 16 comprises a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14. Destination device 14 may comprise one or more data storage media configured to store encoded video data and decoded video data.

In some examples, encoded data (e.g., encoded video data) may be output from output interface 24 to a storage device. Similarly, encoded data may be accessed from the storage device by input interface 26. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure may be applied to video coding in support of any of a variety of multimedia applications, such as over-the-air television broadcasts, cable television transmissions, satellite television transmissions, Internet streaming video transmissions, such as adaptive streaming techniques including dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 26 of destination device 14 receives information from computer-readable medium 16. The information of computer-readable medium 16 may include syntax information defined by video encoder 22 of video encoder 22, which is also used by video decoder 30, that includes syntax elements that describe characteristics and/or processing of blocks and other coded units, e.g., groups of pictures (GOPs). Storage media 28 may store encoded video data received by input interface 26. Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device.

Video encoder 22 and video decoder unit 30 each may be implemented as any of a variety of suitable encoder or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and may execute the instructions in hardware using one or more processors to perform the techniques of this disclosure. Each of video encoder 22 and video decoder 30 may be included in one or more encoders or decoders, either of which may be integrated as part of a combined encoder/decoder (CODEC) in a respective device.

In some examples, video encoder 22 and video decoder 30 may operate according to a video coding standard. Example video coding standards include, but are not limited to, ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-View Video Coding (MVC) extensions. The video coding standard High Efficiency Video Coding (HEVC) or ITU-T H.265, including its range and screen content coding extensions, 3D video coding (3D-HEVC) and multiview extensions (MV-HEVC) and scalable extension (SHVC), has been developed by the Joint Collaboration Team on Video Coding (JCT-VC) of ITU-T Video Coding Experts Group (VCEG) and ISO/IEC Motion Picture Experts Group (MPEG). A recent HEVC draft specification, and referred to as HEVC WD hereinafter, is available from http://phenix.int-evry.fr/jct/doc_end_user/documents/14_Vienna/wg11/JCTVC-N1003-v1.zip.

Video encoder 22 and video decoder 30 may also operate in accordance with other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 4)," Joint Video Experts Team (JVET) of ITU-T SG 16 WP 3 and ISO/IEC JTC 1/SC 29/WG 11, 13$^{th}$ Meeting: Marrakech, Mass., 9-18 Jan. 2019, JVET-M1001-v5 (hereinafter "VVC Draft 4"). The techniques of this disclosure, however, are not limited to any particular coding standard.

In HEVC, VVC, and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. A pixel can refer to all three components (luma and chroma samples) for a given location in an array of a picture. In other instances, a picture may be monochrome and may only include an array of luma samples, in which case the terms pixel and sample can be used interchangeably.

Furthermore, in HEVC and other video coding specifications, to generate an encoded representation of a picture, video encoder 22 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

If operating according to HEVC, to generate a coded CTU, video encoder 22 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Syntax data within a bitstream may also define a size for the CTU. A slice includes a number of consecutive CTUs in coding order. A video frame or picture may be partitioned into one or more slices. As mentioned above, each tree block may be split into CUs according to a quad-tree. In general, a quad-tree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. If a block of CU is split further, it may be generally referred to as a non-leaf-CU. In some examples of this disclosure, four sub-CUs of a leaf-CU may be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node as well as prediction units (PUs) and transform units (TUs) associated with the coding node. A size of the CU corresponds to a size of the coding node and may be, in some examples, square in shape. In the example of HEVC, the size of the CU may range from 8×8 pixels up to the size of the tree block with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs. The TUs may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quad-tree structure, sometimes called a "residual quad tree" (RQT). The leaf nodes of the RQT may be referred to as TUs. Pixel difference values associated with the TUs may be transformed to produce transform coefficients, which may be quantized.

A leaf-CU may include one or more PUs. In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a RQT, which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more TUs. The TUs may be specified using an RQT (also referred to as a TU quad-tree structure), as discussed above. For example, a split flag may indicate whether a leaf-CU is split into four transform units. In some examples, each transform unit may be split further into further sub-TUs. When a TU is not split further, it may be referred to as a leaf-TU. Generally, for intra coding, all the leaf-TUs belonging to a leaf-CU contain residual data produced from the same intra-prediction mode. That is, the same intra-prediction mode is generally applied to calculate predicted values that will be transformed in all TUs of a leaf-CU. For intra coding, video encoder 22 may calculate a residual value for each leaf-TU using the intra-prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective RQT structures. That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU).

As discussed above, video encoder 22 may partition a coding block of a CU into one or more prediction blocks. A prediction block is a rectangular (i.e., square or non-square) block of samples on which the same prediction is applied. A PU of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 22 may generate predictive blocks (e.g., luma, Cb, and Cr predictive blocks) for prediction blocks (e.g., luma, Cb, and Cr prediction blocks) of each PU of the CU.

Video encoder 22 and video decoder 30 may be configured to operate according to VVC. According to VVC, a video coder (such as video encoder 22) partitions a picture into a plurality of coding tree units (CTUs). Video encoder 22 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 22 and video decoder 30 may use a single QTBT or MTT structure to represent each of the luminance and chrominance components, while in other examples, video encoder 22 and video decoder 30 may use two or more QTBT or MTT structures, such as one QTBT/MTT structure for the luminance component and another QTBT/MTT structure for both chrominance components (or two QTBT/MTT structures for respective chrominance components).

In VVC, a picture can be partitioned into slices, tiles, and bricks. In general, a brick can be a rectangular region of CTU rows within a particular tile in a picture. A tile can be a rectangular region of CTUs within a particular tile column and a particular tile row in a picture. A tile column is a rectangular region of CTUs having a height equal to the height of the picture and a width specified by syntax elements in the picture parameter set. A tile row is a rectangular region of CTUs having a height specified by syntax elements in the picture parameter set and a width equal to the width of the picture. In some cases, a tile may be partitioned into multiple bricks, each of which can include one or more CTU rows within the tile. A tile that is not partitioned into multiple bricks is also referred to as a brick. However, a brick that is a true subset of a tile is not referred to as a tile. A slice can be an integer number of bricks of a picture that are exclusively contained in a single NAL unit. In some cases, a slice can include either a number of complete tiles or only a consecutive sequence of complete bricks of one tile.

Video encoder 22 and video decoder 30 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

Video encoder 22 may use intra prediction or inter prediction to generate the predictive blocks for a PU. If video encoder 22 uses intra prediction to generate the predictive blocks of a PU, video encoder 22 may generate the predictive blocks of the PU based on decoded samples of the picture that includes the PU. After video encoder 22 generates predictive blocks (e.g., luma, Cb, and Cr predictive blocks) for one or more PUs of a CU, video encoder 22 may generate one or more residual blocks for the CU. For instance, video encoder 22 may generate a luma residual block for the CU. Each sample in the CU's luma residual block indicates a difference between a luma sample in one of the CU's predictive luma blocks and a corresponding sample in the CU's original luma coding block. In addition, video encoder 22 may generate a Cb residual block for the CU. Each sample in the Cb residual block of a CU may indicate a difference between a Cb sample in one of the CU's predictive Cb blocks and a corresponding sample in the CU's original Cb coding block. Video encoder 22 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, as discussed above, video encoder 22 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 22 may apply one or more transforms a transform block of a TU to generate a coefficient block for the TU. For instance, video encoder 22 may apply one or more transforms to a luma transform block of a TU to generate a luma coefficient block for the TU. A coefficient block may be a two-dimensional array of transform coefficients. A transform coefficient may be a scalar quantity. Video encoder 22 may apply one or more transforms to a Cb transform block of a TU to generate a Cb coefficient block for the TU. Video encoder 22 may apply one or more transforms to a Cr transform block of a TU to generate a Cr coefficient block for the TU.

In some examples, video encoder 22 skips application of the transforms to the transform block. In such examples, video encoder 22 may treat residual sample values in the same way as transform coefficients. Thus, in examples where video encoder 22 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), video encoder 22 may quantize the coefficient block to possibly reduce the amount of data used to represent the coefficient block, potentially providing further compression. Quantization generally refers to a process in which a range of values is compressed to a single value. For example, quantization may be done by dividing a value by a constant, and then rounding to the nearest integer. To quantize the coefficient block, video encoder 22 may quantize transform coefficients of the coefficient block. After video encoder 22 quantizes a coefficient block, video encoder 22 may entropy encode syntax elements indicating the quantized transform coefficients. For example, video encoder 22 may perform Context-Adaptive Binary Arithmetic Coding (CABAC) or other entropy coding techniques on the syntax elements indicating the quantized transform coefficients.

Video encoder 22 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Video decoder 30 may receive a bitstream generated by video encoder 22. Video decoder 30 may decode the bitstream to reconstruct pictures of the video data. As part of decoding the bitstream, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 22. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The techniques disclosed herein are built upon block-based intra prediction which is part of video standards including AVC, HEVC, and VVC. In block-based intra prediction, typically, lines of reference samples from adjacent reconstructed blocks are used for predicting samples within the current block. One or multiple lines of samples may be used for prediction. The reference samples are employed by typical intra-prediction modes such as DC, Planar, and angular/directional modes.

Intra prediction performs image block prediction using the block's spatially neighboring reconstructed image samples. With intra prediction, an N×M (e.g., 4×4) block is predicted by the above and left neighboring reconstructed samples (reference samples) along a selected prediction direction. As one example, the block is predicted by the above and left neighboring reconstructed samples (i.e., reference samples) along a selected prediction direction. The reference samples are external to the block being predicted. With the reference samples, a video encoder 22 constructs a prediction block having prediction samples based on the reference samples.

In general, intra prediction techniques, the video encoder 22 determines a residual block indicating differences between the prediction block and the current block (e.g., residual values indicating differences between prediction samples and samples of the current block), and signals information indicative of the residual values in the residual block. The video decoder 30 similarly determines the reference samples and constructs the prediction block. The video decoder 30 determines the residual values of the residual block based on the received information and adds the residual values of the residual block to the prediction samples of the prediction block to reconstruct the current block.

As described in more detail, the example techniques described in this disclosure modify one or more (e.g., all) of the prediction samples of the prediction block. The video encoder 22 may determine the residual values based on the modified prediction samples. The video decoder 30 may add the residual values to the modified prediction samples to reconstruct the current block.

There are a plurality of intra-prediction modes (also referred to as "intra modes"). In some examples, the intra prediction of a luma block includes 35 modes, including the Planar mode, DC mode, and 33 angular modes (e.g., diagonal intra-prediction modes and angular modes adjacent to the diagonal intra-prediction modes). The encoder 22 and/or the decoder 30 may select the prediction mode for each block that minimizes the residual between the prediction block and the block to be encoded (e.g., based on a Sum of Absolute Errors (SAE), Sum of Absolute Differences (SAD), Sum of Absolute Transformed Differences (SATD), or other measure of similarity). For instance, the SAE can be calculated by taking the absolute difference between each pixel (or sample) in the block to be encoded and the corresponding pixel (or sample) in the prediction block being used for comparison. The differences of the pixels (or samples) are summed to create a metric of block similarity, such as the L1 norm of the difference image, the Manhattan distance between two image blocks, or other calculation. Using SAE as an example, the SAE for each prediction using each of the intra-prediction modes indicates the magnitude of the prediction error. The intra-prediction mode that has the best match to the actual current block is given by the intra-prediction mode that gives the smallest SAE.

The 35 modes of the intra prediction are indexed as shown in Table 1 below. In other examples, more intra modes may be defined including prediction angles that may not already be represented by the 33 angular modes. In other examples, the prediction angles associated with the angular modes may be different from those used in HEVC.

TABLE 1

Specification of intra-prediction mode and associated names

| Intra-prediction mode | Associated name |
|---|---|
| 0 | INTRA_PLANAR |
| 1 | INTRA_DC |
| 2 . . . 34 | INTRA_ANGULAR2 . . . INTRA_ANGULAR34 |

To perform Planar prediction for an N×N block, for each sample $p_{xy}$ located at (x, y), the prediction sample value may be calculated by applying a bilinear filter to four specific neighboring reconstructed samples (used as reference samples for intra prediction). The four reference samples include the top-right reconstructed sample TR, the bottom-left reconstructed sample BL, and the two reconstructed samples located at the same column $(r_{x,-1})$ and row $(r_{-1,y})$ of the current sample. The Planar mode can be formulated as below:

$$p_{xy}=((N-x1)*L+(N-y1)*T+x1*R+y1*B)/(2*N),$$

where x1=x+1, y1=y+1, R=TR and B=BL.

For DC mode, the prediction block is filled with the average value of the neighboring reconstructed samples. Generally, both Planar and DC modes are applied for modeling smoothly varying and constant image regions.

Figure 3:
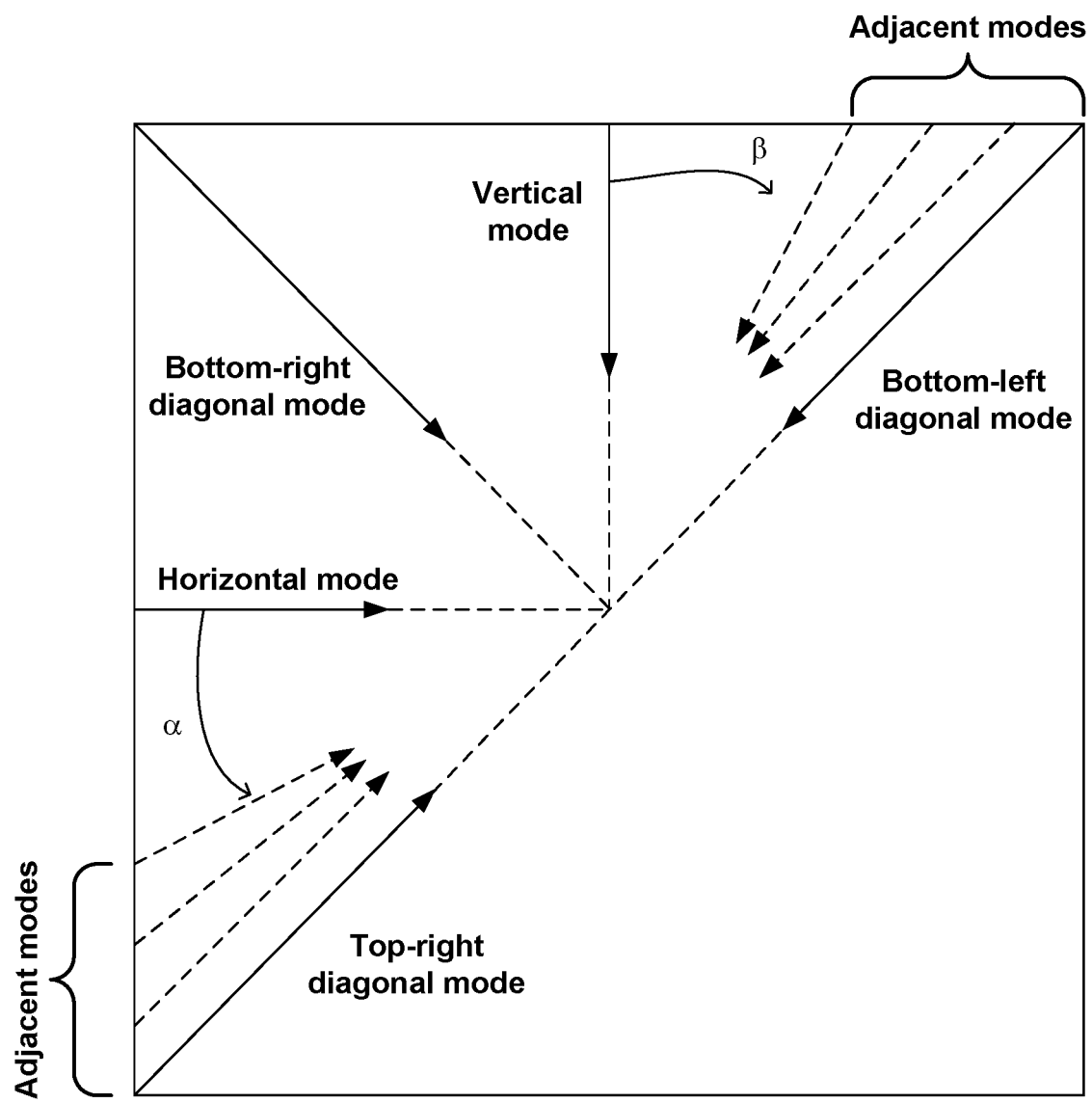
FIG. 3 is a conceptual diagram illustrating examples of intra prediction angular modes, in accordance with some examples.

For angular intra-prediction modes in HEVC, which include 33 different prediction directions, the intra prediction process can be described as follows. For each given angular intra-prediction mode, the intra-prediction direction can be identified accordingly; for example, intra mode 18 corresponds to a pure horizontal prediction direction, and intra mode 26 corresponds to a pure vertical prediction direction. Angular prediction modes are shown in FIG. 3. In some codecs, a different number of intra-prediction modes may be used. For example, in addition to Planar and DC modes, 65 angular modes may be defined, where mode 2 indicates a prediction direction of −135°, mode 34 indicates a prediction direction of −45°, and mode 66 indicates a prediction direction of 45°. In some codecs (e.g., VVC), angles beyond −135° (less than)−135° and beyond 45° (more than 45°) may also be defined; these may be referred to as wide-angled intra modes. Although the description herein is with respect to the intra mode design in HEVC (i.e., with 35 modes), the techniques disclosed may also apply to more intra modes including wide-angled intra modes.

Coordinates (x,y) of each sample of a prediction block are projected along a specific intra prediction direction (e.g., one of the angular intra-prediction modes). For example, given a specific intra prediction direction, the coordinates (x, y) of a sample of the prediction block are first projected to the row/column of neighboring reconstructed samples along the intra prediction direction. In cases when (x,y) is projected to the fractional position a between two neighboring reconstructed samples L and R; then the prediction value for (x, y) may be calculated using a two-tap bi-linear interpolation filter, formulated as follows:

$$p_{xy}=(1-a)\cdot L+a\cdot R.$$

To avoid floating point operations, in HEVC, the above calculation may be approximated using integer arithmetic as:

$$p_{xy}=((32-a')\cdot L+a'\cdot R+16)>>5,$$

where a' is an integer equal to 32*a.

In some examples, before intra prediciton, the neighboring reference samples are filtered using a 2-Tap bilinear or 3-Tap (1,2,1)/4 filter, as known as intra reference smoothing, or mode-dependent intra smoothing (MDIS). When doing intra prediciton, given the intra-prediction mode index (predModeIntra) and block size (nTbS), it is decided whether a reference smoothing process is performed and which smoothing filter is used. The intra-prediction mode index is an index indicating an intra-prediction mode.

The prediction samples of a prediction block are generated using the above example techniques. After the prediction samples are generated, one or more of the prediction samples may be modified using Position Dependent (Intra) Prediction Combination (PDPC). Forms of PDPC are described in ITU-T SG16/Q6 Doc. COM16-C1046, "Position Dependent intra Prediction Combination (PDPC), and X. Zhao, V Seregin, A. Said, M. Karczewicz, "EE1 related: Simplification and extension of PDPC", 8th JVET Meeting, Macau, October 2018, JVET-H0057, which is hereby incorporated by reference in its entirety and for all purposes. Disclosed in that document is the introduction of PDPC applied to Planar, DC, horizontal and vertical modes without signaling as summarized in the following.

For example, a prediction sample pred(x,y) located at (x, y) is predicted with an intra-prediction mode (e.g., Planar, DC, or angular), and its value is modified using the PDPC expression for a single reference sample line as follows:

$$\text{pred}(x,y) = (wL \times R_{-1,y} + wT \times R_{x,-1} - wTL \times R_{-1,-1} + (64 - wL - wT + wTL) \times \text{pred}'(x,y) + 32) >> 6, \quad \text{(Equation 1)}.$$

Figure 2A:
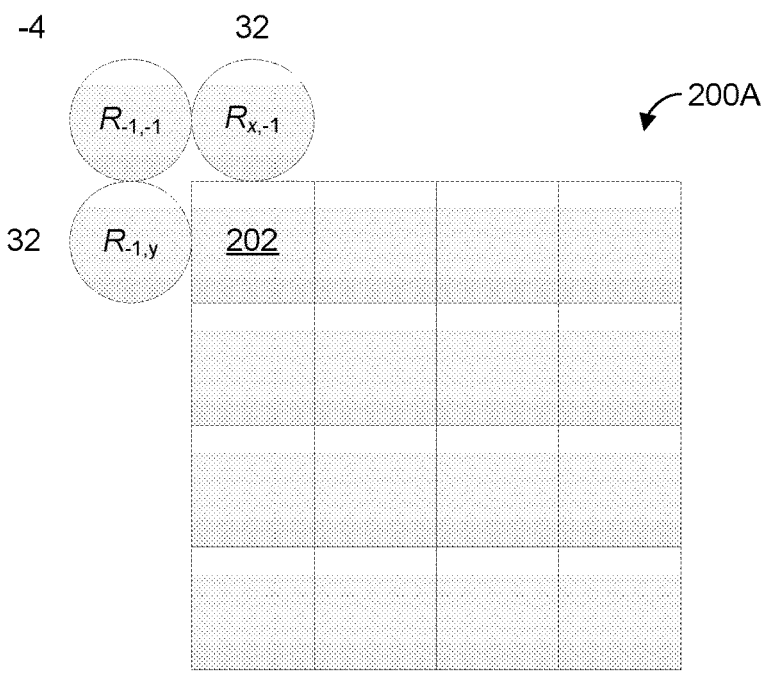
FIGS. 2A and 2B are conceptual diagrams illustrating examples of DC mode Position Dependent (Intra) Prediction Combination (PDPC) weights for prediction sample positions inside a 4×4 block, in accordance with some examples.

In Equation 1, pred'(x,y) is the value of the prediction sample determined using an intra-prediction mode as described above for generating prediction samples, and pred(x,y) is the modified value of pred'(x,y). The terms $R_{x,-1}$ and $R_{-1,y}$ represent the reference samples located at the top and left of current sample (x, y) (the adjacent top and left samples external to the current block), respectively, and the term $R_{-1,-1}$ represents the reference sample located at the top-left corner of the current block (the adjacent top-left corner external to the current block). For instance, as shown in FIG. 2A (described below), from the perspective of a first prediction sample 202 located in a top-left corner of a block 200A, $R_{x,-1}$ represents a sample that is one row above the current block with the same x-coordinate as the x-coordinate of the prediction sample being modified (corresponding to the value pred'(x,y)), $R_{-1,y}$ represents a sample that is one column to the left of (or "on a left side of") the current block with the same y-coordinate as the y-coordinate of the prediction sample being modified, and $R_{-1,-1}$ represents a sample that is one column to the left of the current block and one row above the current block.

The samples (e.g., reference samples used for PDPC) that are being used to modify the prediction sample (generated using the intra-prediction mode) are samples in the picture (e.g., luma and chroma samples), and not necessarily other prediction samples (although possible). For example, for a current block being intra predicted that has a size of N×M, the video encoder 22 and/or the video decoder 30 may generate an N×M sized prediction block. The reference samples used to modify the prediction samples are those of the current picture (including the current block) and are external to the current block (in one or more neighboring blocks of the current block).

The coordinate system for identifying the samples external to the current block are relative to the current block. For example, the sample located at the top-left corner of the current block has a coordinate of (0, 0). The video encoder 22 may determine a residual between the prediction sample located at the top-left corner of the prediction block (e.g., having coordinate (0, 0)) and the sample in the current block having coordinate (0, 0). To reconstruct the sample located at (0, 0) in the current block, the video decoder 30 may add the prediction sample located at (0, 0) in the prediction block to the residual value corresponding to the sample located at (0, 0). Accordingly, for each sample in the current block, there is a corresponding sample in the prediction block (e.g., having a same coordinate).

Accordingly, $R_{x,-1}$ means that the y-coordinate is −1, and therefore refers to a sample in the row that is above the current block. The x-coordinate may be the same as the x-coordinate of the prediction sample that is being modified. For $R_{-1,y}$, the x-coordinate is −1, and therefore refers to a column that is to the left of the current block. The y-coordinate may be the same as the y-coordinate of the prediction sample that is being modified.

It may be possible to use a different coordinate system as well, such as a coordinate system where the (0, 0) coordinate refers to the top-right sample of the picture. The example techniques are described with respect to a coordinate system where the (0, 0) coordinate refers to the top-left sample of the block.

For the DC mode, the weights are calculated as follows for a block with dimensions width and height:

$$wT = 32 >> ((y<<1) >> \text{shift}), wL = 32 >> ((x<<1) >> \text{shift}),$$
$$wTL = (wL >> 4) + (wT >> 4), \quad \text{(Equation 2)}.$$

In equation 2, shift=$(\log_2(\text{width}) + \log_2(\text{height}) + 2) >> 2$. For Planar mode wTL=0, for horizontal mode wL=0 and wTL=wT, and for vertical mode wT=0 and wTL=wL. In some cases, the PDPC weights can be calculated with adds and shifts only. The value of pred(x,y) can be computed in a single step using Equation 1.

FIG. 2A is a diagram illustrating DC mode PDPC weights (wL, wT, wTL) for a first prediction sample 202 (at sample position (0, 0)) inside one 4×4 block 200A. As shown, the weight wL for the $R_{-1,y}$ PDPC reference sample is 32, the weight wT for the $R_{x,-1}$ PDPC reference sample is 32, and the weight wTL for the $R_{-1,-1}$ PDPC reference sample is −4. The weights (wL, wT, wTL) can be determined according to equation 2 above. As shown in equation 2, the weights are determined based on the position (x,y) of the prediction sample pred(x,y) in the current block.

Figure 2B:
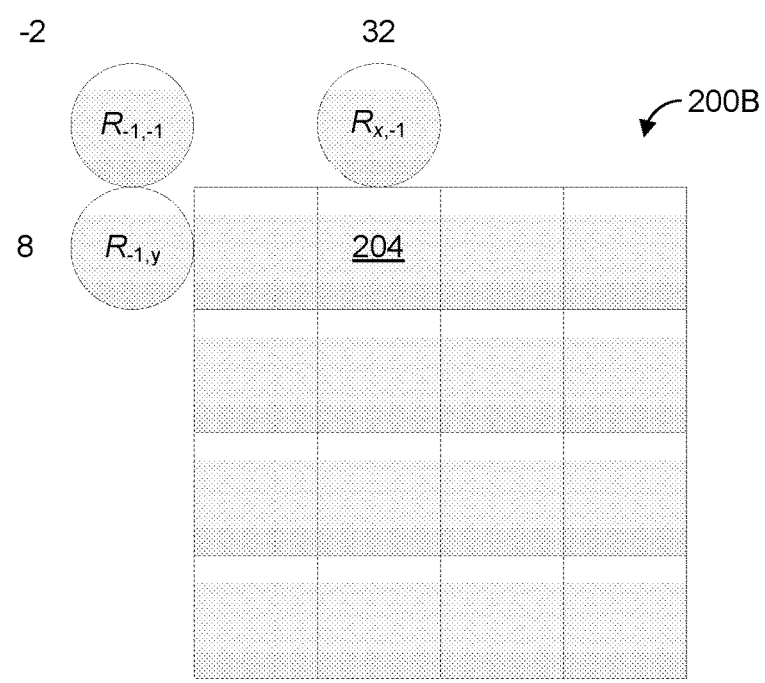

FIG. 2B illustrates DC mode PDPC weights (wL, wT, wTL) for sample position (1, 0) inside one 4×4 block. As shown, the weight wL for the $R_{-1,y}$ PDPC reference sample is 8, the weight wT for the $R_{x,-1}$ PDPC reference sample is 32, and the weight wTL for the $R_{-1,-1}$ PDPC reference sample is −2. The weights (wL, wT, wTL) can be determined according to equation 2 above.

In some cases, if PDPC is applied to DC, Planar, horizontal, and vertical intra modes, additional boundary filters are not applied, such as the DC mode boundary filter or horizontal/vertical mode edge filters. In some cases, Equation 1 may be generalized to include additional reference sample lines (e.g., not limited to samples one row above or one row left of the current block). In this case, multiple reference samples are available in the neighborhoods of $R_{x,-1}$, $R_{-1,-1}$, and each may have a weight assigned that can be optimized, for example, by training.

In some cases, PDPC can be extended to angular modes generally (e.g., to the diagonal intra modes and to the angular modes that are adjacent to the diagonal modes). The intended diagonal intra modes are the modes that predict according to the bottom-left and top-right directions, as well as several adjacent angular modes, for example, N adjacent modes between the bottom-left diagonal mode and vertical mode, and N or M adjacent modes between the top-right diagonal mode and horizontal mode. FIG. 3 illustrates the identification of the angular modes as disclosed herein. In general, the adjacent modes may be a selected subset of available angular modes. The spacing between angular modes may, for example, be nonuniform and some angular modes may, for example, be skipped.

In some examples, the video encoder 22 and the video decoder 30 can be configured to perform PDPC where the current block is intra predicted in an angular mode that excludes DC, planar, vertical, or horizontal modes. However, there may be technical complexities in extending PDPC to angular intra-prediction modes. For example, the reference samples, while located external to the current block need not have the same x- and/or y-coordinates as the prediction sample being modified. Therefore, it may be uncertain which reference samples to use for modifying the prediction sample, such that video coding efficiencies are gained.

For example, if the information needed to signal the residual values is reduced, there is an increase in bandwidth efficiencies. Accordingly, the PDPC reference samples used to modify the prediction block (determined using intra-prediction) should be such that the residual values generated from the modified prediction block require a lesser amount of information to be signaled, as compared to other techniques. However, if the determination of which reference samples to use is overly intensive, there may be latency in how long it takes video decoder 30 to reconstruct the current block.

Figure 4A:
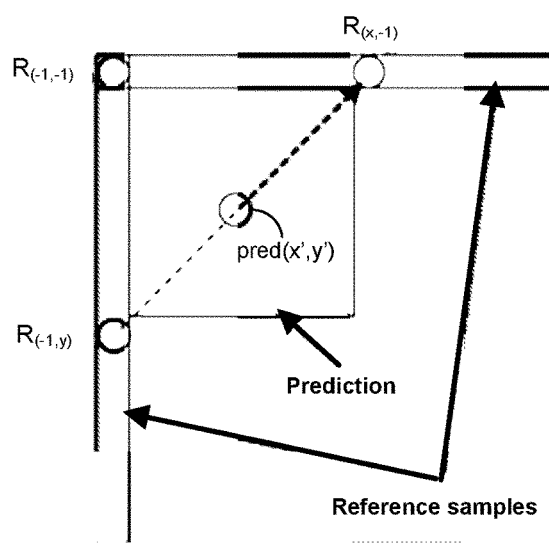
FIG. 4A is a conceptual diagram illustrating an example of a diagonal top-right mode, in accordance with some examples.

FIG. 4A-FIG. 4D illustrate definitions of samples used by PDPC extended to diagonal and adjacent angular intra modes. The dashed arrows in FIG. 4A-FIG. 4D indicate the prediction direction (e.g., from FIG. 3) and originate from the reference sample used for the intra-predicted prediction sample pred(x',y'). FIG. 4A illustrates the definition of PDPC reference samples $R_{(x,-1)}$, $R_{(-1,y)}$, and $R_{(-1,-1)}$ for the extension of PDPC to the top-right diagonal mode. The prediction sample pred(x',y') is located at (x',y') within the prediction block. The coordinate x of the PDPC reference sample $R_{(x,-1)}$ is given by: x=x'+y'+1, and the coordinate y of the PDPC reference sample $R_{(-1,y)}$ is similarly given by: y=x'+y'+1. The PDPC weights for the top-right diagonal mode are, for example: wT=16>>((y'<<1)>>shift), wL=16>>((x'<<1)>>shift), wTL=0.

Figure 4B:
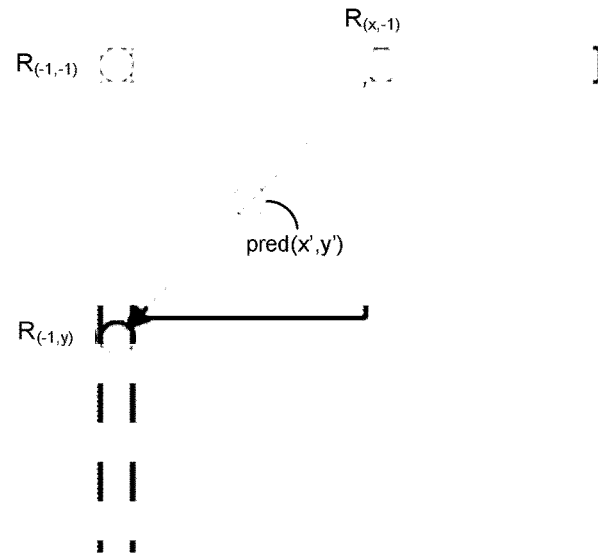
FIG. 4B is a conceptual diagram illustrating an example of a diagonal bottom-left mode, in accordance with some examples.

FIG. 4B illustrates the definition of reference samples $R_{(x,-1)}$, $R_{(-1,y)}$, and $R_{(-1,-1)}$ for the extension of PDPC to the bottom-left diagonal mode. The coordinate x of the PDPC reference sample $R_{(x,-1)}$ is given by: x=x'+y'+1, and the coordinate y of the PDPC reference sample $R_{(-1,y)}$ is given by: y=x'+y'+1. The PDPC weights for the top-right diagonal mode are, for example: wT=16>>((y'<<1)>>shift), wL=16>>((x'<<1)>>shift), wTL=0.

In FIG. 4A and FIG. 4B, the video encoder 22 and the video decoder 30 can each determine a row that is above the current block (e.g., immediately above but the techniques are not so limited) and determine an x-coordinate in the determined row. The x-coordinate in the determined row is equal to an x-coordinate of the prediction sample plus a y-coordinate of the prediction sample plus 1. The video encoder 22 and the video decoder 30 can determine a reference sample of the one or more reference samples based on the determined row and the determined x-coordinate.

Similarly, in FIG. 4A and FIG. 4B, the video encoder 22 and the video decoder 30 can determine a column that is to the left of the current block (e.g., immediately to the left but the techniques are not so limited) and can determine a y-coordinate in the determined column. The y-coordinate in the determined column is equal to an x-coordinate of the prediction sample plus a y-coordinate of the prediction sample plus 1. The video encoder 22 and the video decoder 30 can determine a reference sample of the one or more reference samples based on the determined column and the determined y-coordinate.

Based on the determined x and y-coordinates, the video encoder 22 and the video decoder 30 can determine the reference samples (e.g., a first reference sample based on the determined row and determined x-coordinate and a second reference sample based on the determined column and determined y-coordinate). The video encoder 22 and the video decoder 30 can also determine the weights according to the above example techniques for the diagonal modes (e.g., top-right diagonal mode and bottom-left diagonal mode, as two examples). Then, based on Equation 1 (as one non-limiting example), the video encoder 22 and the video decoder 30 can determine the modified prediction sample (e.g., pred(x,y)).

Figure 4C:
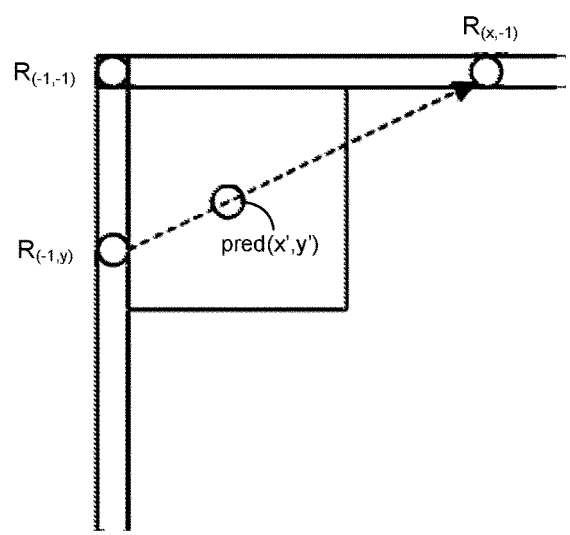
FIG. 4C is a conceptual diagram illustrating an example of an adjacent diagonal top-right mode, in accordance with some examples.

The case of an adjacent top-right diagonal mode is illustrated in FIG. 4C. In general, for the angle $\alpha$ defined in FIG. 3, the y-coordinate of the PDPC reference sample $R_{(-1,y)}$ is determined as follows: y=y'+tan($\alpha$)×(x'+1), and the x coordinate of the PDPC reference sample $R_{(x,-1)}$ is given by: x=x'+cotan($\alpha$)×(y'+1), with tan($\alpha$) and cotan($\alpha$) the tangent and cotangent of the angle $\alpha$, respectively. The PDPC weights for an adjacent top-right diagonal mode are, for example: wT=32>>((y'<<1)>>shift), wL=32>>((x'<<1)>>shift), wTL=0 or wT=32>>((y'<<1)>>shift), wL=0, wTL=0.

Figure 4D:
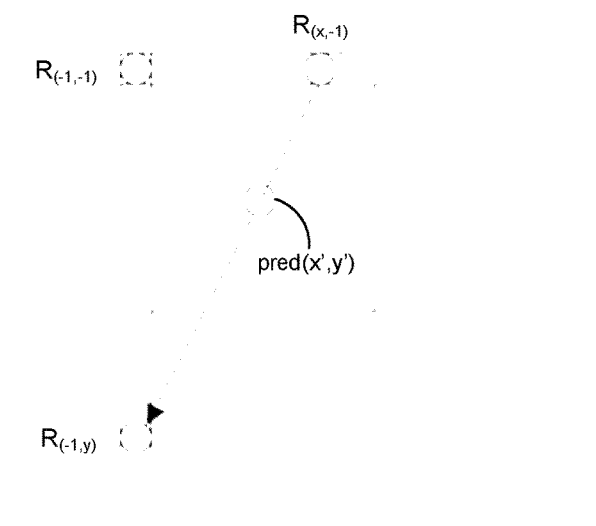
FIG. 4D is a conceptual diagram illustrating an example of an adjacent diagonal bottom-left mode, in accordance with some examples.

Similarly, the case of an adjacent bottom-left diagonal mode is illustrated in FIG. 4D. In general, for the angle $\beta$ defined in FIG. 3, the x coordinate of the PDPC reference sample $R_{(x,-1)}$ is determined as follows x=x'+tan($\beta$)×(y'+1), and the y coordinate of the PDPC reference sample $R_{(-1,y)}$ is given by y=y'+cotan($\beta$)×(x'+1), with tan($\beta$) and cotan($\beta$) the tangent and cotangent of the angle $\beta$, respectively. The PDPC weights for an adjacent bottom-left diagonal mode are, for example: wL=32>>((x'<<1)>>shift), wT=32>>((y'<<1)>>shift), wTL=0 or wL=32>>((x'<<1)>>shift), wT=0, wTL=0.

In FIG. 4C and FIG. 4D, the video encoder 22 and the video decoder 30 can each determine a row that is above the current block (e.g., immediately above but the techniques are not so limited) and can determine an x-coordinate in the determined row. The x-coordinate in the determined row is based on an angle of the angular intra-prediction mode. The video encoder 22 and the video decoder 30 can determine a reference sample of the one or more reference samples based on the determined row and the determined x-coordinate.

To determine the x-coordinate in the determined row, the video encoder 22 and the video decoder 30 can determine one of a cotangent (e.g., for adjacent top-right diagonal mode) or tangent (e.g., for adjacent bottom-left diagonal mode) of the angle of the angular intra-prediction mode. The video encoder 22 and the video decoder 30 can determine the x-coordinate in the determined row based on one of the cotangent or tangent of the angle of the angular intra-prediction mode, an x-coordinate of the prediction sample, and a y-coordinate of the prediction sample. For instance, for adjacent top-right diagonal angular intra-prediction mode, the x-coordinate in the determined row is equal to x'+cotan($\alpha$)×(y'+1) and for adjacent bottom-left diagonal mode, the x-coordinate in the determined row is equal to x'+tan($\beta$)×(y'+1), where x' and y' are the x and y-coordinates of the prediction sample being modified.

Similarly, in FIG. 4C and FIG. 4D, the video encoder 22 and the video decoder 30 can each determine a column that is to the left of the current block (e.g., immediately to the left but the techniques are not so limited) and can determine a y-coordinate in the determined column. The y-coordinate in the determined column is based on an angle of the angular intra-prediction mode. The video encoder 22 and the video decoder 30 can determine a reference sample of the one or more reference samples based on the determined column and the determined y-coordinate.

To determine the y-coordinate in the determined column, the video encoder 22 and the video decoder 30 can determine one of a cotangent (e.g., for adjacent bottom-left diagonal mode) or tangent (e.g., for adjacent top-right diagonal mode) of the angle of the angular intra-prediction mode. The video encoder 22 and the video decoder 30 can determine the y-coordinate in the determined column based on one of the cotangent or tangent of the angle of the angular intra-prediction mode, an x-coordinate of the prediction sample, and a y-coordinate of the prediction sample. For instance, for adjacent top-right diagonal angular intra-prediction mode, the y-coordinate in the determined column is equal to y'+tan(α)×(x'+1), and for adjacent bottom-left diagonal mode, the y-coordinate in the determined column is equal to y'+cotan(β)×(x'+1), where x' and y' are the x and y-coordinates of the prediction sample being modified.

Based on the determined x and y-coordinates, the video encoder 22 and the video decoder 30 can determine the reference samples (e.g., a first reference sample based on the determined row and determined x-coordinate and a second reference sample based on the determined column and determined y-coordinate). The video encoder 22 and the video decoder 30 can also determine the weights according to the above example techniques for the adjacent diagonal modes (e.g., adjacent top-right diagonal mode and adjacent bottom-left diagonal mode, as two examples). Then, based on Equation 1 (as one non-limiting example), the video encoder 22 and the video decoder 30 can determine the modified prediction sample (e.g., pred(x,y)).

As described above, PDPC can be applied to angular intra-prediction modes with minimal impact to complexity. In a practical implementation, the values of the tangents and cotangents of angles can be stored in tables so that they are not computed on the fly (e.g., at run-time). The following are example tables for 129 angular modes in total:

TanAngTable[33]={0, 1, 2, 3, 4, 5, 6, 8, 10, 12, 14, 16, 18, 20, 22, 24, 26, 28, 30, 32, 34, 36, 38, 40, 42, 44, 46, 49, 52, 55, 58, 61, 64}.

CotanAngTable[33]={0, 65536, 32768, 21845, 16384, 13107, 10923, 8192, 6554, 5461, 4681, 4096, 3641, 3277, 2979, 2731, 2521, 2341, 2185, 2048, 1928, 1820, 1725, 1638, 1560, 1489, 1425, 1337, 1260, 1192, 1130, 1074, 1024}.

The values in the tangent table indicate the location of a sample found using an intra-prediction mode. A value in the cotangent table indicates the location of a PDPC reference sample according the corresponding value in the tangent table. For example, a first entry in the tangent table (indicating a location of an intra-prediction sample) corresponds to a first entry in the cotangent table (indicating a location of a PDPC reference sample).

Moreover, the tables may already be employed by the angular intra prediction of blocks and can be reused for the PDPC extension to diagonal and adjacent modes (e.g., the angular intra-prediction modes). Therefore, no additional tables may be required in the implementation of PDPC. In some examples, custom tables can be produced, for example by training, to further optimize PDPC.

In some video codecs, the block structure used for specifying the prediction block for intra prediction is not restricted to be square (width w=height h). Rectangular prediction blocks (w>h or w<h) can increase the coding efficiency based on the characteristics of the content. In such rectangular blocks, restricting the direction of intra prediction to be within the angles illustrated in FIG. 3 (between −135 degrees to 45 degrees of the current block relative to a vertical direction from a prediction sample) can result in situations where farther reference samples are used rather than closer reference samples for intra prediction.

Figure 5:
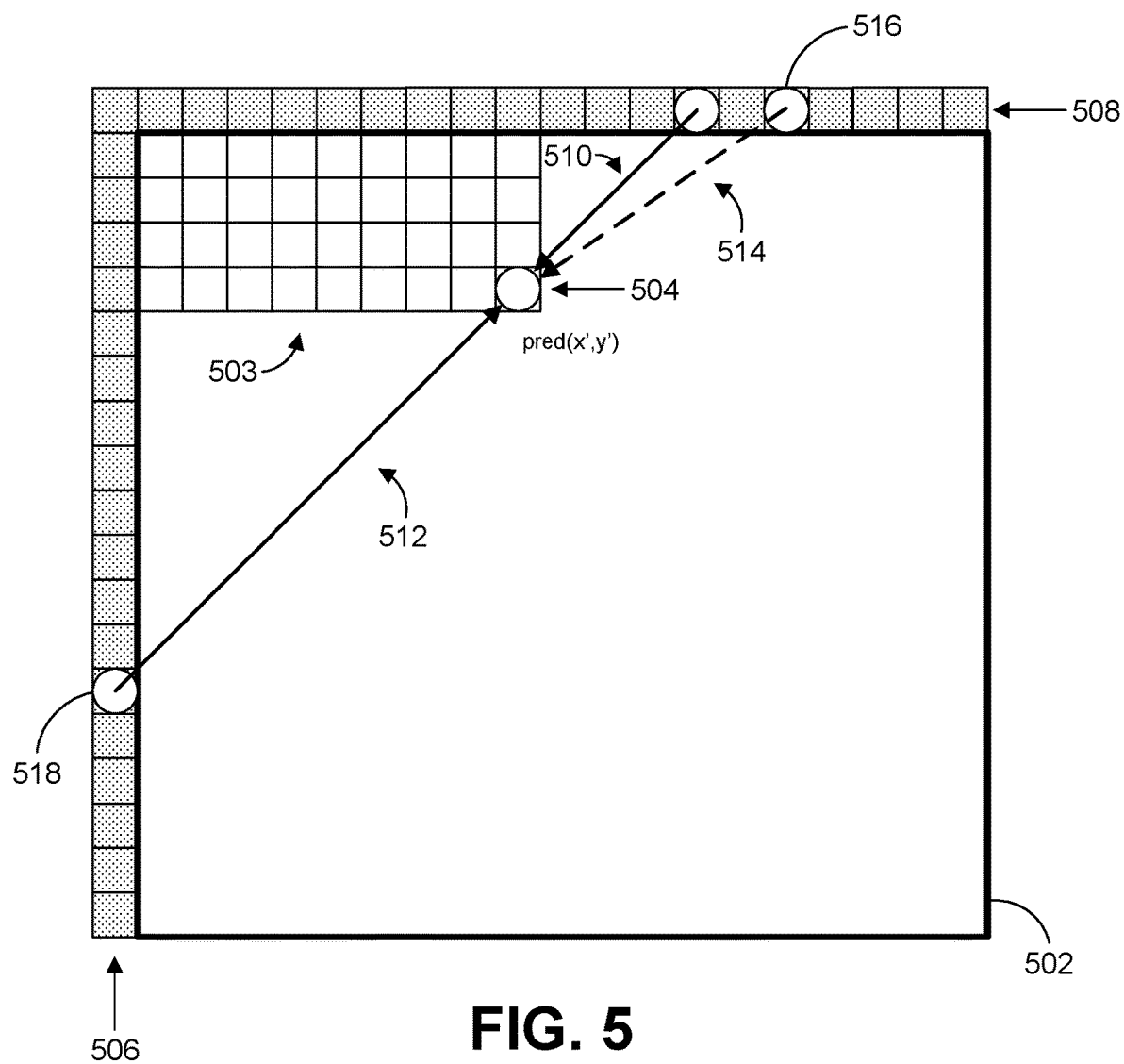
FIG. 5 is a conceptual diagram illustrating an example of a directional intra-prediction mode, in accordance with some examples.

FIG. 5 is a diagram illustrating an example of a directional intra-prediction mode where farther reference samples are used for intra prediction of a current block 503 of a current picture 502, rather than closer reference samples. The current block 503 is a 4×8 rectangular block of samples. Reference samples 506 and reference samples 508 are also shown. The reference samples 506 can be part of one or more blocks above the current picture 502, and the reference samples 508 can be part of one or more blocks to the left of the current picture 502.

Intra prediction is performed to determine a prediction sample 504 (denoted as pred(x',y')). Due to the restriction of the intra-prediction direction to be in the range −135 degrees to 45 degrees (as shown in FIG. 3), closer reference samples are not used, but farther reference samples may be used. For example, a bottom-left diagonal mode can be used to predict the prediction sample 504, the angle or direction of the bottom-left diagonal mode being illustrated by the arrow 512. A top-right diagonal mode could also be used, the angle or direction of that mode being illustrated by the arrow 510. The bottom-left diagonal mode can be at a −135 degree angle relative to a vertical direction from the prediction sample 504, which is the lowest bottom-left angle that can be used in the range of −135 degrees to 45 degrees.

The dashed arrow 514 corresponds to an angle that is greater than the 45 degree angle used in typical intra-prediction modes (those shown in FIG. 3). As shown in FIG. 5, the reference sample 518 determined using the bottom-left diagonal model (illustrated by arrow 512) is further from the prediction sample 504 than the reference sample 516 that could be determined using a wider angle intra-prediction mode (illustrated by dashed arrow 514). Such a design is likely to have an impact in the coding efficiency. It would be more beneficial to have the range of restrictions relaxed so that closer reference samples (e.g., beyond the −135 to 45 degree angle) can be used for prediction.

Figure 6:
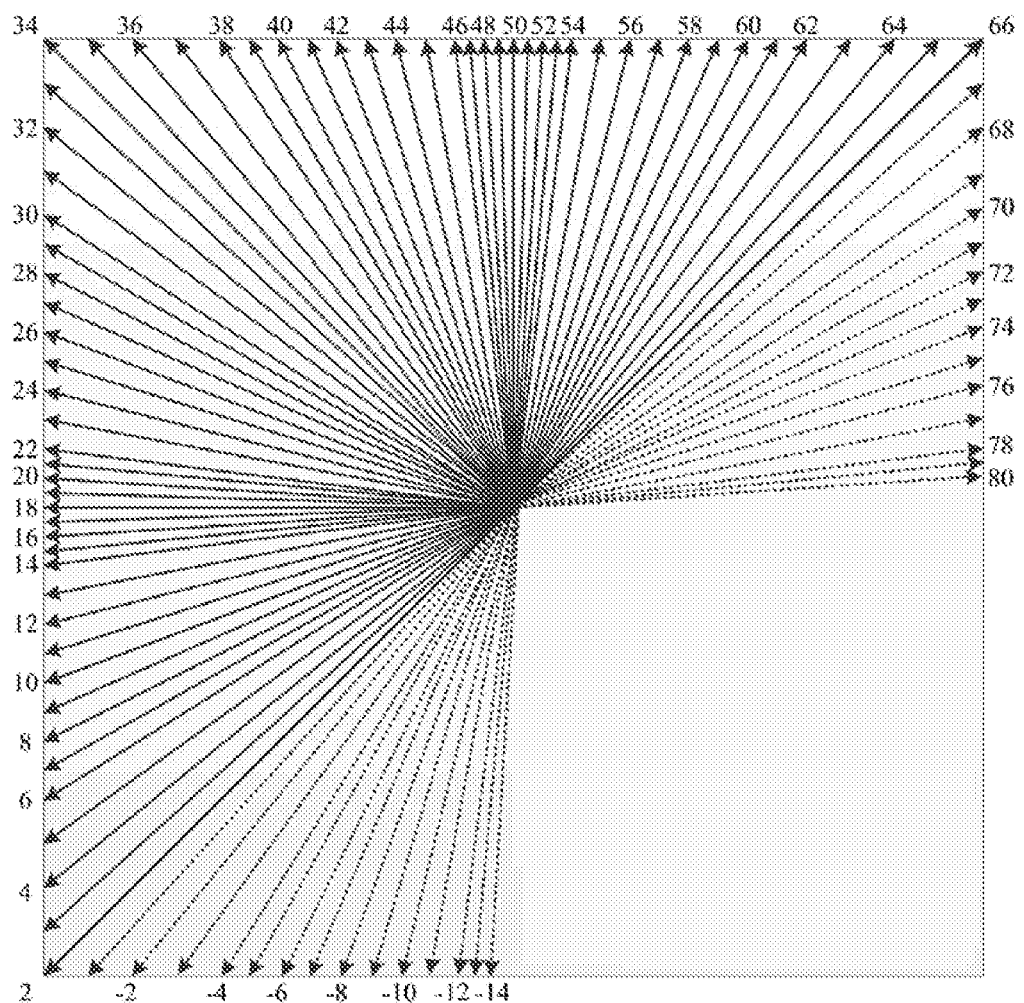
FIG. 6 is a conceptual diagram illustrating examples of directional intra-prediction modes, including wide-angle modes, in accordance with some examples.

FIG. 6 is a diagram illustrating examples of directional intra-prediction modes, including intra-prediction modes that extend beyond the −135 (intra-prediction mode 2) to 45 degree (intra-prediction mode 66) angles. For example, the directional intra-prediction modes 67 to 80 and −1 to −14, illustrated with dashed arrows, can be referred to as wide angle intra-prediction modes. It is noted that the arrows in FIG. 6 point to the corresponding reference samples used for prediction and do not indicate the prediction direction. The prediction direction is the opposite of where the arrow points. For example, the prediction direction of intra-prediction mode 68 is from the number 68 in FIG. 6 (which is the approximate position of the reference sample used in mode 68) to the middle of the block. As noted above, PDPC can be used to modify prediction samples determined using intra prediction. For instance, using PDPC, the video encoder 22 and/or the video decoder 30 can determine reference samples that are present in one or more lines above and/or to the left of the current block, and can use the reference samples to modify the prediction samples determined using intra prediction. The modified prediction samples can then be used to encode or decode the current block. However, when one or more of the wide angle intra-prediction modes are used, it is not clear from the current video coding Standards how PDPC should be applied.

Systems and techniques are described herein for extending the use of PDPC to wide angle intra-prediction modes that use angles outside of the standard angles of −135 degrees (mode 2) to 45 degrees (mode 66). The systems and techniques provide a practical application to video coding techniques such as those for PDPC used with wide angle intra-prediction modes. For instance, the example techniques provide for a technical solution for use of PDPC with wide angle intra-prediction modes. Example ways in which video encoder 22 and video decoder 30 may perform PDPC with angular intra-prediction modes is described in more detail below.

As one example, the video encoder 22 can be configured to obtain a current block of video data, and determine a size of the current block. For example, the width and height of the current block can be analyzed to determine whether the current block is rectangular. In some cases, the video encoder 22 can determine whether the current block is a vertically-oriented block (where height>width) or a horizontally-oriented block (where width>height). The video encoder 22 can determine that a wide angle intra-prediction mode will be used for the current block based on the size of the current block (e.g., based on the block being rectangular). The wide angle intra-prediction mode is not a DC, planar, horizontal, or vertical intra-prediction mode, and has a direction that is less than −135 degrees or greater than 45 degrees relative to a vertical direction from each prediction sample of the prediction block.

In some cases, the angle of the diagonal spanning from the bottom-left of the current block to the top-left of the current block can be used as a restriction on selection of the intra-prediction mode, where any intra-prediction mode having an angle that does not exceed the diagonal of the current block (from a bottom-left corner to a top-right corner of the block) can be selected. The intra-prediction mode can be selected from the allowable intra-prediction modes based on the techniques described above. For example, the intra-prediction mode for each block that minimizes the residual between the prediction block and the block to be encoded (e.g., based on a Sum of Absolute Errors (SAE), Sum of Absolute Differences (SAD), Sum of Absolute Transformed Differences (SATD), or other measure of similarity) can be selected from the allowable intra-prediction modes.

The video encoder 22 can be configured to determine a prediction block (which includes a plurality of prediction samples) for the current block based on the wide angle intra-prediction mode. The video encoder 22 can be configured to modify a prediction sample of the prediction block to generate a modified prediction sample using PDPC. It should be understood that although the techniques are described with respect to one prediction sample, the example techniques are not so limited. In some examples, video encoder 22 may modify the other prediction samples of the prediction block using PDPC.

To modify the prediction sample, the video encoder 22 can determine one or more reference samples (PDPC reference samples) that are external to the current block based on the wide angle intra-prediction mode, and can modify the prediction sample to generate the modified prediction sample based on the determined one or more reference samples. The one or more reference samples can be identified using the direction or angle of the selected wide angle intra-prediction mode. For example, if the prediction sample is selected from a pixel row of a neighboring block located above the current block at an angle n relative to a vertical direction from the prediction sample location, a first PDPC reference sample can be selected from a pixel column of a neighboring block located to the left of the current block at the same angle n relative to the sample location. In some examples, a second PDPC reference sample can be selected from the same sample location as that used for the prediction sample. In some cases, the value from the sample location can be filtered or smoothed in order to obtain the second PDPC reference sample. In some examples, a third PDPC reference sample can be selected from a sample location in a neighboring block that is adjacent to the top-left sample of the current block (e.g., the $R_{-1,-1}$ location shown in FIG. 4A). The first PDPC reference sample (and in some cases the second and/or third PDPC reference samples) can be used to modify the prediction sample in the prediction block in order to generate the modified prediction sample. In one illustrative example, the modified prediction sample can be determined by calculating a weighted combination (using one or more weights) of the first PDPC reference sample, the second PDPC reference sample, the third PDPC reference sample, and the prediction sample, such as using Equation 1 above.

The video encoder 22 can determine a residual value for a residual block based on the modified prediction sample and a sample value in the current block, and can signal information indicative of the residual value.

As another example, the video decoder 30 can be configured to obtain a current block of video data, and determine a size of the current block. For example, the width and height of the current block can be analyzed to determine whether the current block is rectangular. In some cases, the video decoder 30 can determine whether the current block is a vertically-oriented block (where height>width) or a horizontally-oriented block (where width>height). The video encoder 22 can determine that a wide angle intra-prediction mode will be used for the current block based on the size of the current block (e.g., based on the block being rectangular). The wide angle intra-prediction mode is not a DC, planar, horizontal, or vertical intra-prediction mode, and has a direction that is less than −135 degrees or greater than 45 degrees relative to a vertical direction from each prediction sample of the prediction block.

The video decoder 30 can be configured to determine a prediction block, which includes a plurality of prediction samples, for a current block based on the wide angle intra-prediction mode. The video decoder 30 can modify a prediction sample of the prediction block to generate a modified prediction sample using PDPC. Similar to above, although the techniques are described with respect to one prediction sample, the example techniques are not so limited. In some examples, the video decoder 30 may modify the other prediction samples of the prediction block using PDPC.

To modify the prediction sample, the video decoder 30 can be configured to determine one or more reference samples that are external to the current block based on the wide angle intra-prediction mode and to modify the prediction sample to generate the modified prediction sample based on the determined one or more reference samples. Similar to that described above with respect to the video encoder 22, the one or more reference samples can be identified using the direction or angle of the selected wide angle intra-prediction mode. For example, a first PDPC reference sample can be selected from a pixel column or row of a neighboring block at the same angle n relative to the sample location. In some examples, a second PDPC reference sample can be selected from the same sample location as that used for the prediction sample (the value of which be filtered or smoothed in order to obtain the second PDPC reference sample), and/or a third PDPC reference sample can be selected from a sample location in a neighboring block that is adjacent to the top-left sample of the current block (e.g., the $R_{-1,-1}$ location shown in FIG. 4A). The first PDPC reference sample (and in some cases the second and/or third PDPC reference samples) can be used to modify the prediction sample in the prediction block in order to generate the modified prediction sample (e.g., using Equation 1 above). The video decoder 30 can also be configured to reconstruct a sample of the current block based on the modified prediction sample and a residual value.

Figure 7:
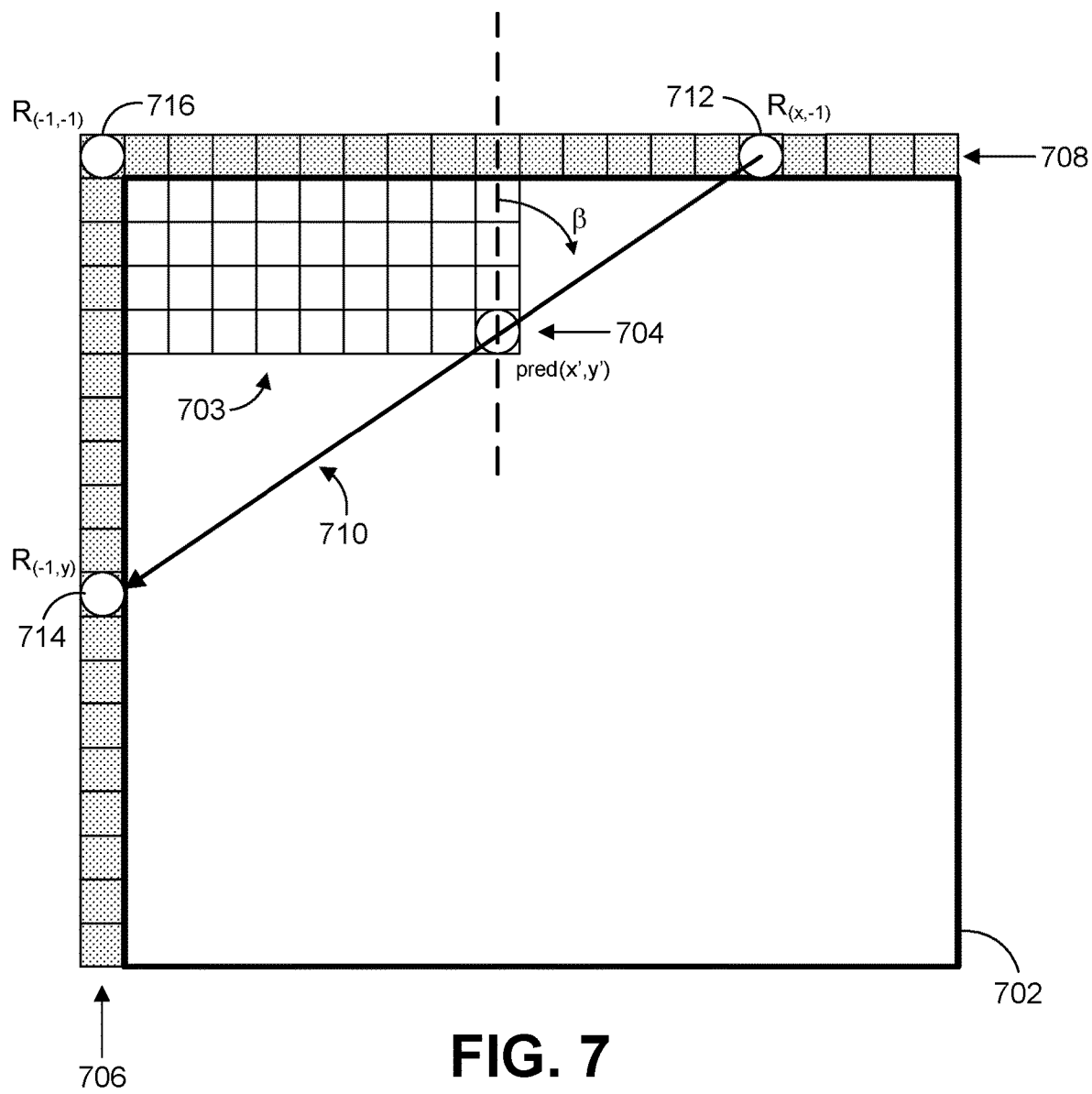
FIG. 7 is a conceptual diagram illustrating an example of an intra-prediction mode using a wide-angle mode and PDPC, where PDPC is performed using the wide-angle mode, in accordance with some examples.

FIG. 7 is a diagram illustrating an example of PDPC performed with a wide angle intra-prediction mode. A current picture 702 is shown with a current block 703 of video data. The current block 703 is a 4×8 rectangular block of samples (e.g., luma and/or chorma component samples, or a full set of luma and chroma component samples making up a block of pixels). Neighboring reconstructed reference samples 706 and neighboring reconstructed reference samples 708 are also shown. The neighboring reference samples 706 can be part of one or more blocks above the current picture 702, and the neighboring reference samples 708 can be part of one or more blocks to the left of the current picture 702.

A coding device (e.g., the video encoder 22 and/or the video decoder 30) can determine a size of the current block 703, and can determine or select an intra-prediction mode to perform based on the size of the current block 703. As described above, the coding device can determine that a wide angle intra-prediction mode will be used for the current block 703 based on the size of the current block 703. For instance, a wide angle intra-prediction mode can be used when it is determined that the current block is a rectangular block (the width and height are of different sizes). In some cases, any intra-prediction mode having an angle that does not exceed the diagonal of the current block 703 (from a bottom-left corner to a top-right corner of the block) can be selected for use in predicting the current block 703. In some cases, the block size ratios can be used to determine the intra-prediction mode to use. For instance, the block size ratio of a rectangular block can be used to determine the diagonal direction from bottom-left to top-right, and therefore, the allowed range of prediction angles (or directions).

In some examples, intra-prediction modes (including modes 2 to 66) that are outside of the angle of the diagonal of the block 703 can be disallowed, and additional wide-angle modes that are within the angle of the diagonal of the block 703 can be made available for selection by the coding device. For example, for the horizontally-oriented rectangular block 703 (where width>height), if the angle associated with intra-prediction mode 5 (as shown in FIG. 6) is the angle of the diagonal of the block 703 (from the bottom-left corner to the top-right corner), then modes 2, 3, and 4 can be disallowed, and additional modes 67, 68, and 69 (with angles greater than 45° relative to a vertical direction from each sample location in the current block 703) can be made available for predicting one or more prediction samples of a prediction block of the current block 703.

Based on an analysis of the various available intra-prediction modes (e.g., based on block size ratios, based on the SAE or other similarity measure noted above, or using other suitable analysis), the coding device can select a wide angle intra-prediction mode (e.g., wide angle intra-prediction mode 67, 68, or 69) for performing intra prediction for a sample location of the current block 703. The arrow 710 in FIG. 7 indicates the prediction direction (or prediction angle) of the selected wide angle intra-prediction mode, and originates from the reference sample 712 used for intra-prediction of the prediction sample 704 (denoted as pred(x', y')). The wide angle intra-prediction mode illustrated in FIG. 7 is an adjacent diagonal bottom-left mode (e.g., wide angle intra-prediction mode 69 from FIG. 6).

Using the selected wide angle intra-prediction mode, the prediction sample 704 (pred(x',y')) can be determined for a bottom-right sample location in the prediction block of the current block 703. For example, a value of the sample 712 from the neighboring reference samples 708 can be selected as the value for the prediction sample 704, based on the direction (represented by the arrow 710) of the selected wide angle intra-prediction mode. In some cases, the same wide angle intra-prediction mode can be used for each prediction sample of the prediction block. In some cases, different intra-prediction mode (including wide angle modes) can be used for different prediction samples of the prediction block.

The coding device can then perform PDPC to determine one or more PDPC reference samples that will be used to modify the value of the prediction sample 704. The one or more PDPC reference samples can be identified using the direction (represented by the arrow 710) of the selected wide angle intra-prediction mode. For example, as noted above and shown in FIG. 7, the sample 712 from the row of reference samples 708 located above the current block 703 is selected as the prediction sample 704 (pred(x',y')). The prediction sample 704 (pred(x',y')) is located at a location (x',y') within the prediction block. A first PDPC reference sample 714 (denoted as $R_{(-1,y)}$) is selected from the column of reference samples 706 located to the left of the current block 703 and along the same prediction direction (defined by the arrow 710) of the wide angle intra-prediction mode. For the angle β shown in FIG. 7 (also shown in FIG. 3), the y-coordinate of the reference sample $R_{(-1,y)}$ is determined as: y=y'+cotan(β)×(x'+1), with cotan(β) being the cotangent of the angle β. Examples of cotangent values are described below.

In some implementations, a second PDPC reference sample (denoted as $R_{(x,-1)}$ can also be selected from the same sample location 712 that was used for the prediction sample 704. In such an example, the same sample value (the value of sample 712) can be used for the prediction sample 704 and for the second PDPC reference sample $R_{(x,-1)}$, in which case the predication sample 704 (pred(x',y')) is identical to the second PDPC reference sample $R_{(x,-1)}$. For the angle β shown in FIG. 7, the x-coordinate of is given by: x=x'+tan(β)×(y'+1), with tan(β) being the tangent of the angle β. Examples of tangent values are described below.

In some cases, the value of the sample 712 can be filtered or smoothed in order to obtain the second PDPC reference sample $R_{(x,-1)}$, in which case the value of the second PDPC reference sample $R_{(x,-1)}$ would be different than the value of the prediction sample 704. As noted above, the predication sample 704 (pred(x',y')) is identical to $R_{(x,-1)}$ if the second reference sample $R_{(x,-1)}$ sample is unfiltered. In some examples, reference sample value can be filtered using intra reference smoothing, mode-dependent intra smoothing (MDIS), reference sample adaptive filtering (RSAF), adaptive reference sample smoothing (ARSS), and/or other filtering technique. For instance, a 2-Tap bilinear filter, a 3-Tap [1,2,1]/4 smoothing filter, or other filter can be used.

In one illustrative example, the value of the sample 712 can be filtered by a [1 2 1] smoothing filter (or other filter), and the filtered value can be used as the second PDPC reference sample $R_{(x,-1)}$. Using the 3-tap [1 2 1]/4 smoothing filter as an example, the outer-most reference samples p[−1][2N−1] and p[2N−1][−1] are not modified (where N is the number of samples in the x- and/or y-direction), and all other reference samples are filtered by using two neighboring reference samples. As described in more detail below, the number of taps of the filter may be adapted based on the particular intra-prediction mode that is selected, based on the size of the block, based on characteristics of one or more neighboring blocks, any combination thereof, and/or using other factors.

In some implementations, a third PDPC reference sample 716 (denoted as $R_{(-1,-1)}$) can be selected from a neighboring block that is adjacent to the top-left sample of the current block 703. The first PDPC reference sample 714 ($R_{(-1,y)}$), the second PDPC reference sample $R_{(x,-1)}$, and the third PDPC reference samples 716 ($R_{(-1,-1)}$) can be used to modify the prediction sample 704 (pred(x',y')) to generate a modified prediction sample, which can be denoted as (pred (x,y)). For example, using Equation 1 from above, the modified prediction sample pred(x,y) can be determined by calculating a weighted combination of the first PDPC reference sample 714, the second PDPC reference sample $R_{(x,-1)}$, the third PDPC reference sample 716, and the prediction sample pred(x',y'). The weights can be determined using the techniques described above. For example, the PDPC weights for the adjacent bottom-left diagonal mode are, for example: wL=32>>((x'<<1)>>shift), wT=32>>((y'<<1)>>shift), wTL=0 or wL=32>> ((x'<<1)>>shift), wT=0, wTL=0.

To determine the PDPC reference sample $R_{(x,-1)}$ (e.g., the second PDPC reference sample in FIG. 7), a coding device can determine a row that is above the current block (e.g., immediately above or multiple rows above the current block 703) and can determine an x-coordinate in the determined row. As noted above, the x-coordinate in the determined row is based on a direction (or angle) of the wide angle intra-prediction mode, and the coding device can determine a reference sample based on the determined row and the determined x-coordinate.

To determine the x-coordinate in the determined row, the coding device can determine one of a cotangent (e.g., for adjacent top-right diagonal mode) or tangent (e.g., for adjacent bottom-left diagonal mode) of the angle of the wide angle intra-prediction mode. The coding device can determine the x-coordinate in the determined row based on one of the cotangent or tangent of the angle of the wide angle intra-prediction mode, an x-coordinate of the prediction sample, and a y-coordinate of the prediction sample. In one example, for adjacent bottom-left diagonal wide angle intra-prediction mode (e.g., as shown in FIG. 7), the x-coordinate in the determined row is equal to x=x'+tan(β)×(y'+1). In another example, for adjacent top-right diagonal mode, the x-coordinate in the determined row is equal to x=x'+cotan (α)×(y'+1). Here, x' and y' are the x and y-coordinates of the prediction sample being modified.

Similarly, to determine the PDPC reference sample $R_{(-1,y)}$ (e.g., the first PDPC reference sample 714 in FIG. 7), the coding device can determine a column that is to the left of the current block (e.g., immediately to the left or multiple columns to the left of the current block 703) and can determine a y-coordinate in the determined column. As noted above, the y-coordinate in the determined column is based on a direction of the wide angle intra-prediction mode. The coding device can determine a reference sample of the one or more reference samples based on the determined column and the determined y-coordinate.

To determine the y-coordinate in the determined column, the coding device can determine one of a cotangent (e.g., for adjacent bottom-left diagonal mode) or tangent (e.g., for adjacent top-right diagonal mode) of the angle of the angular intra-prediction mode. The coding device can determine the y-coordinate in the determined column based on one of the cotangent or tangent of the angle of the wide angle intra-prediction mode, an x-coordinate of the prediction sample, and a y-coordinate of the prediction sample. For instance, for adjacent top-right diagonal angular intra-prediction mode, the y-coordinate in the determined column is equal to y'+tan(α)$^x$ (x'+1), and for adjacent bottom-left diagonal mode (e.g., the example from FIG. 7), the y-coordinate in the determined column is equal to y'+cotan(β)×(x'+1), where x' and y' are the x and y-coordinates of the prediction sample being modified.

Based on the determined x and y-coordinates, the coding device can determine the PDPC reference samples (e.g., a first PDPC reference sample based on the determined row and determined x-coordinate, and a second PDPC reference sample based on the determined column and determined y-coordinate). The coding device can also determine the weights according to the above example techniques for the adjacent diagonal modes (e.g., adjacent top-right diagonal mode and adjacent bottom-left diagonal mode, as two examples). Then, based on Equation 1 (as one non-limiting example), the coding device can determine the modified prediction sample (e.g., pred(x,y)).

As described above, PDPC can be applied to angular intra-prediction modes with minimal impact to complexity. In a practical implementation, the values of the tangents (e.g., tan(α) and/or tan(β)) and cotangents (e.g., cotan(α) and/or cotan(β)) of angles can be stored in tables so that they are not computed on the fly (e.g., at run-time). The following are example tables for various angular modes (including wide-angle modes):

TanAngTable[32]={0, 1, 2, 3, 4, 6, 8, 10, 12, 14, 16, 18, 20, 23, 26, 29, 32, 35, 39, 45, 51, 57, 64, 73, 86, 102, 128, 171, 256, 341, 512, 1024}.

CotanAngTable[32]={0, 8192, 4096, 2731, 2048, 1365, 1024, 819, 683, 585, 512, 455, 410, 356, 315, 282, 256, 234, 210, 182, 160, 144, 128, 112, 95, 80, 64, 48, 32, 24, 16, 8}; //(256*32)/Angle.

The values in the tangent table "TanAngTable[32]" indicate the location of a sample found using an intra-prediction mode. The tangent table values are normalized by a value of 32. For example, referring to FIG. 6, mode 66 is at 45 degrees (relative to a vertical direction from the center of the block) with a slope of 1, and is predicting from top-right to bottom-left (the sample value from the top-right is used as a prediction sample value for the sample in the middle of the block in FIG. 6). The value of "32" in the tangent table corresponds to mode 66 shown in FIG. 6. The value of "0" in the tangent table corresponds to the vertical mode (mode 50) shown in FIG. 6. The value of "1024" corresponds to mode 80 in FIG. 6.

A value in the cotangent table "CotanAngTable[32]" indicates the location of a PDPC reference sample according the corresponding value in the tangent table. The cotangent table values are normalized by a value of 256. For example, a first entry in the tangent table (indicating a location of an intra-prediction sample) corresponds to a first entry in the cotangent table (indicating a location of a PDPC reference sample). In one example with reference to FIG. 7, if the prediction sample 704 is determined using the reference sample 712, which can have a tangent table value of 35 in the tangent table (the 18$^{th}$ position in the tangent table), the second PDPC sample 714 can correspond to a cotangent table value of 234 (the 18$^{th}$ position in the cotangent table). The cotangent corresponds to 1/tan. As noted above, the value of "0" in the tangent table corresponds to the vertical mode (mode 50) shown in FIG. 6. It is noted that there is no opposite of the vertical mode 50. For mode 51, there is an opposite mode, which is mode −14. Mode 51 corresponds to the value "1" in the tangent table.

The example described above with respect to FIG. 7 (and the example described below with respect to FIG. 8) are for adjacent top-right wide angle intra-prediction modes. The adjacent top-right wide angle intra-prediction modes are provided as an example wide angle intra mode for which PDPC can be applied. The example techniques may be extended to other angular modes as well, such as one or more adjacent bottom-left wide angle intra-prediction modes or other wide angle modes. Also, in some examples, the one or more reference samples can have both an x- and y-coordinate that are different than both an x- and y-coordinate of the prediction sample in the prediction block. For instance, in the above example equations to determine the x and y coordinates in respective rows and columns to determine the reference samples, the x-coordinate can be different than the x-coordinate of the prediction sample being modified, and the y-coordinate can be different than the y-coordinate of the prediction sample being modified. In such cases, the reference samples may not be in the same row or same column as the prediction sample being modified.

As is the case for DC, planar, horizontal and vertical mode PDPC, there may be no additional boundary filtering, for example as specified in 'J. Chen, E. Alshina, G. J. Sullivan, J.-R. Ohm, J. Boyce, "Algorithm description of Joint Exploration Test Model 7," 7th JVET Meeting, Torino, Italy, July 2017, JVET-G1001, for diagonal and adjacent diagonal modes when PDPC is extended to these angular modes.

In some cases, all horizontal angular modes can be mapped to vertical modes by flipping the block around the bottom-right diagonal. The symmetry around the vertical mode allows the number of angles to be further reduced to 33 with stored tangent and cotangent values in the TanAngTable and CotanAngTable, respectively. For example, as described above, the value of "0" in the tangent table corresponds to the vertical mode (mode 50) shown in FIG. 6. Based on the symmetry around the vertical mode, the value of "0" can also correspond to the horizontal mode (mode 18) in FIG. 6. Due to required integer precision, the values in both tables are scaled by factor 64 in case of TanAngTable and value 1024 in case of CotanAngTable. The multiplications in the formulas above for computing coordinates x and y are avoided by accumulating the table values corresponding with the angular mode with increasing x' and y' while traversing the prediction block.

Figure 8:
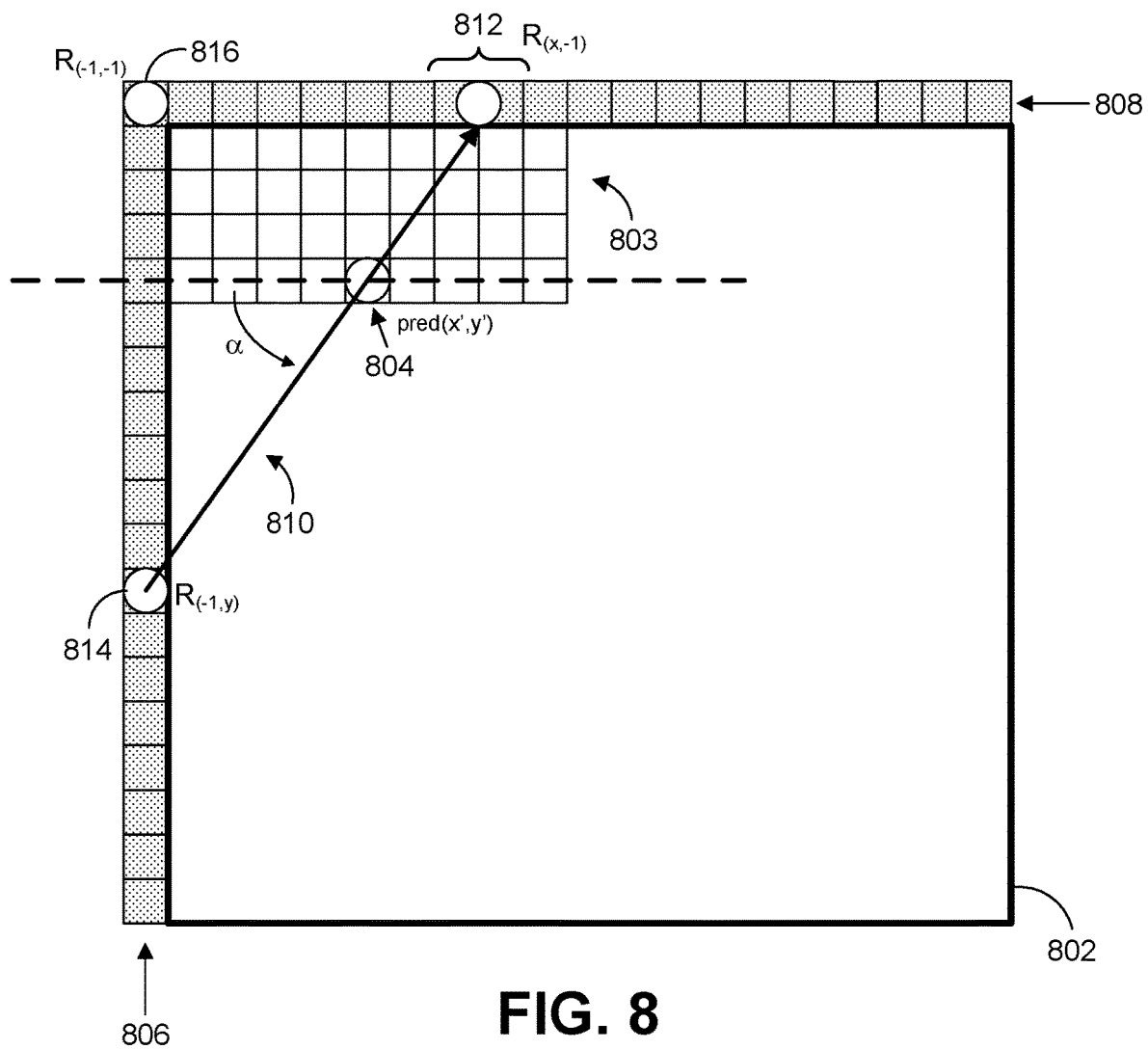
FIG. 8 is a conceptual diagram illustrating another example of an intra-prediction mode using a wide-angle mode and PDPC, where PDPC is performed using the wide-angle mode, in accordance with some examples.

In some cases, the PDPC reference sample identified by the direction (or angle) of the wide angle intra-prediction mode may not correspond to an integer reference sample position, and instead may correspond to a fractional position (e.g., between two samples at integer positions). FIG. 8 is a diagram illustrating another example of PDPC performed with a wide-angle mode. A current picture 802 includes a current block 803, which is a 4×8 rectangular block of samples. Similar to that in FIG. 7, neighboring reconstructed reference samples 806 and neighboring reconstructed reference samples 808 are also shown, which can be part of one or more blocks above and to the left, respectively, of the current picture 802.

A coding device (e.g., the video encoder 22 and/or the video decoder 30) can determine a size of the current block 803, and can select an intra-prediction mode to perform based on the size of the current block 803. A wide angle intra-prediction mode can be used based on the determination that the current block is a rectangular block. For instance, similar to that described above with respect to FIG. 7, based on an analysis of the various available intra-prediction modes (e.g., based on the SAE or other similarity measure noted above), the coding device can select a wide angle intra-prediction mode (e.g., wide angle intra-prediction mode −2, −3, or −4) for performing intra prediction for a sample location of the current block 803. The arrow 810 in FIG. 8 indicates the prediction direction of the selected wide angle intra-prediction mode, and originates from the reference sample 814 used for intra-prediction of the prediction sample 804 (denoted as pred(x',y')). The wide angle intra-prediction mode illustrated in FIG. 8 is an adjacent diagonal top-right mode (e.g., wide angle intra-prediction mode −3 from FIG. 6).

Using the direction (represented by arrow 810) of the selected wide angle intra-prediction mode, a value of a sample 814 from the neighboring reference samples 806 can be selected as the value for the prediction sample 804 (denoted as pred(x',y')) in the prediction block of the current block 803. The coding device can then determine one or more PDPC reference samples that will be used to modify the value of the prediction sample 804. For instance, using techniques similar to those described above, a first PDPC reference sample (denoted as $R_{(x,-1)}$), and in some cases a second PDPC reference sample (denoted as $R_{(-1,y)}$) and/or a third PDPC reference sample 816 (denoted as $R_{(-1,-1)}$) can be determined. The third PDPC reference sample 816 ($R_{(-1,-1)}$) can be selected from a neighboring block that is adjacent to the top-left sample of the current block 803.

The prediction sample 804 (pred(x',y')) is located at a location (x',y') within the prediction block. The first PDPC reference sample $R_{(x,-1)}$ is selected from the row of reference samples 808 located above the current block 803 and along the same prediction direction (defined by the arrow 810) of the wide angle intra-prediction mode. For the angle α shown in FIG. 8 (also shown in FIG. 3), the x-coordinate of the reference sample $R_{(x,-1)}$ is determined as: x=x'+cotan(α)× (y'+1), with cotan(α) being the cotangent of the angle α. Examples of cotangent values are described above.

The second PDPC reference sample ($R_{(-1,y)}$) can also be selected from the same sample location 814 that was used for the prediction sample 804. In such an example, the same sample value (the value of sample 814) can be used for the prediction sample 804 and for the second PDPC reference sample $R_{(-1,y)}$, in which case the predication sample 804 (pred(x',y')) is identical to the second PDPC reference sample $R_{(-1,y)}$. As noted above, the value of the sample 814 can be filtered or smoothed in order to obtain the second PDPC reference sample $R_{(-1,y)}$, in which case the value of the second PDPC reference sample $R_{(-1,y)}$ would be different than the value of the prediction sample 804. For the angle α shown in FIG. 8, the y-coordinate of $R_{(-1,y)}$ is given by: y=y'+tan(α)×(x'+1), with tan(α) being the tangent of the angle α. Examples of tangent values are described above.

The first PDPC reference sample $R_{(x,-1)}$, the second PDPC reference sample $R_{(-1,y)}$, and the third PDPC reference samples 816 ($R_{(-1,-1)}$) can be used to modify the prediction sample 804 (pred(x',y')) to generate a modified prediction sample, denoted as (pred(x,y)), such as by calculating a weighted combination (e.g., using Equation 1 above) of the PDPC reference samples and the prediction sample pred(x',y'). For example, the PDPC weights for the adjacent top-right diagonal mode are, for example: wT=32>>((y'<<1)>>shift), wL=32>>((x'<<1)>>shift), wTL=0 or wT=32>>((y'<<1)>>shift), wL=0, wTL=0

As shown in FIG. 8, the first PDPC reference sample $R_{(x,-1)}$ does not correspond to an integer reference sample position, and instead is at a fractional position between two samples 812 that are each at integer positions. In such an instance, the PDPC reference sample $R_{(x,-1)}$ can be interpolated based on the two reference samples 812. Interpolation of the reference samples 812 can be performed, for example, by linear or cubic interpolation, or nearest neighbor rounding may be used if fractional values are calculated. In some cases, the interpolation can be performed using an interpolation filter. For instance, the interpolation filter can apply linear interpolation between the two reference samples 812. In some cases, the interpolation filter and the number taps used for the interpolation filter used for obtaining a PDPC reference sample can depend on the intra-prediction mode, a size of the block (e.g., a width and height), characteristics of one more neighboring blocks (e.g., whether a neighboring block is coded using intra-prediction), any combination thereof, and/or based on other factors. In one illustrative example, a 6-tap-Gaussian filter may be used for interpolation for certain block sizes and modes beyond 45 degrees, and 4-tap-Guassian filter may be used for other block sizes and modes beyond −135 degrees.

Interpolation is one illustrative example of determining a PDPC reference sample that is in a fractional (non-integer) position. In some examples, the coding device (e.g., video encoder 22 and/or the video decoder 30) can perform at least one of interpolation, rounding with offset, and/or rounding without offset. The coding device can perform such rounding with or without offset based on neighboring samples in the set of one or more samples to generate the one or more reference samples.

In some examples, clipping may be required to prevent the access of reference samples outside the reference line buffer boundaries in case large coordinate values are computed. If clipping is performed, the last available reference sample may be used or PDPC may fall back to angular intra prediction only, which is equivalent to applying zero weights for wL, wT, wTL in Equation 1, for example. For instance, to determine one or more reference samples that are external to the current block based on the angular intra-prediction mode, the coding device can be configured to determine that one or more samples external to the current block identified based on the angular intra-prediction mode are not stored in a reference line buffer and, can determine the one or more reference samples based on a last reference sample stored in the reference line buffer.

In some examples, rather than using the last sample in the reference line buffer, PDPC may be disabled for the current block or PDPC may be disabled for certain predicted samples such that normal intra prediction (e.g., without modified prediction samples) is used. As one example, for a prediction sample in the prediction block, the coding device can determine that a first reference sample is available in the reference buffer but that a second reference sample is not available in the reference buffer. In this example, the coding device can determine that PDPC is disabled for the prediction sample. However, in some examples, the coding device can utilize the first reference sample for PDPC and not utilize the second reference sample (e.g., by setting a weight for the second reference sample equal to zero).

In some examples, as noted above, the reference samples used for the PDPC filtering may be filtered (or smoothed) by a filter (e.g., a [1 2 1] filter or a stronger filter). The number of taps may be adapted based on the particular mode, the size of the block (e.g., a width and height), the characteristics of one or more neighboring blocks, any combination thereof, and/or based on other factors. For example, if the intra mode indicates a wide-angle prediction mode, a stronger filter may be applied on the reference samples to obtain the PDPC reference samples. In some examples, for long intra-prediction distances, smoothing filtering can be applied, which removes some noise and can result in better prediction.

In some cases, the filter used for reference filtering and/or the filter used for interpolation filtering may be different for the vertical reference samples (to the left of the current block) and the horizontal reference samples (above the current block). In some alternatives, the decision to use different filters may depend on the size of the block (e.g., width and height), the intra mode used for prediction, characteristics of one or more neighboring blocks, any combination thereof, and/or based on other factors.

In some examples, more than one reference line from a neighboring block may be used for intra prediction and/or for determining PDPC reference samples. When more than one reference line from a neighboring block may be used for intra prediction, the PDPC reference samples may be obtained for wide angle intra-prediction modes for the additional reference line(s), which may be obtained by combining two or more reference lines, or by selecting one or more reference lines from the neighborhood of the block.

In some cases, when a wide angle intra-prediction is used, PDPC may be restricted based on a size of the block, the intra mode used for prediction, characteristics of one or more neighboring blocks, any combination thereof, and/or based on other factors. For example, PDPC may be disabled for small blocks that are less than a size threshold (e.g., blocks with a width and/or height of less than four pixels, such as 4×4 blocks).

As described above, in some examples, the coding device can perform the example PDPC techniques on a plurality of prediction samples in a prediction block. However, there may be instances where PDPC techniques are used on some of the prediction samples but not on other prediction samples in the same prediction block. For example, for a first prediction sample in a prediction block, the coding device (e.g., the video encoder 22 and/or the video decoder 30) can perform the PDPC techniques described herein. However, for a second prediction sample in the same prediction block, the reference samples needed for performing the PDPC techniques on the second prediction sample may not be stored in the reference line buffer. In this example, for the second prediction sample, the coding device may not perform PDPC techniques and normal intra-prediction techniques may be utilized. In some cases, for the second prediction sample, it may be possible that one of the reference samples is available in the reference line buffer but the other one is not. In some examples, the coding device may not perform PDPC techniques on the second prediction sample or may utilize only the reference sample that is available and assign a zero weight to the weights applied to the reference sample that is not available.

Figure 9:
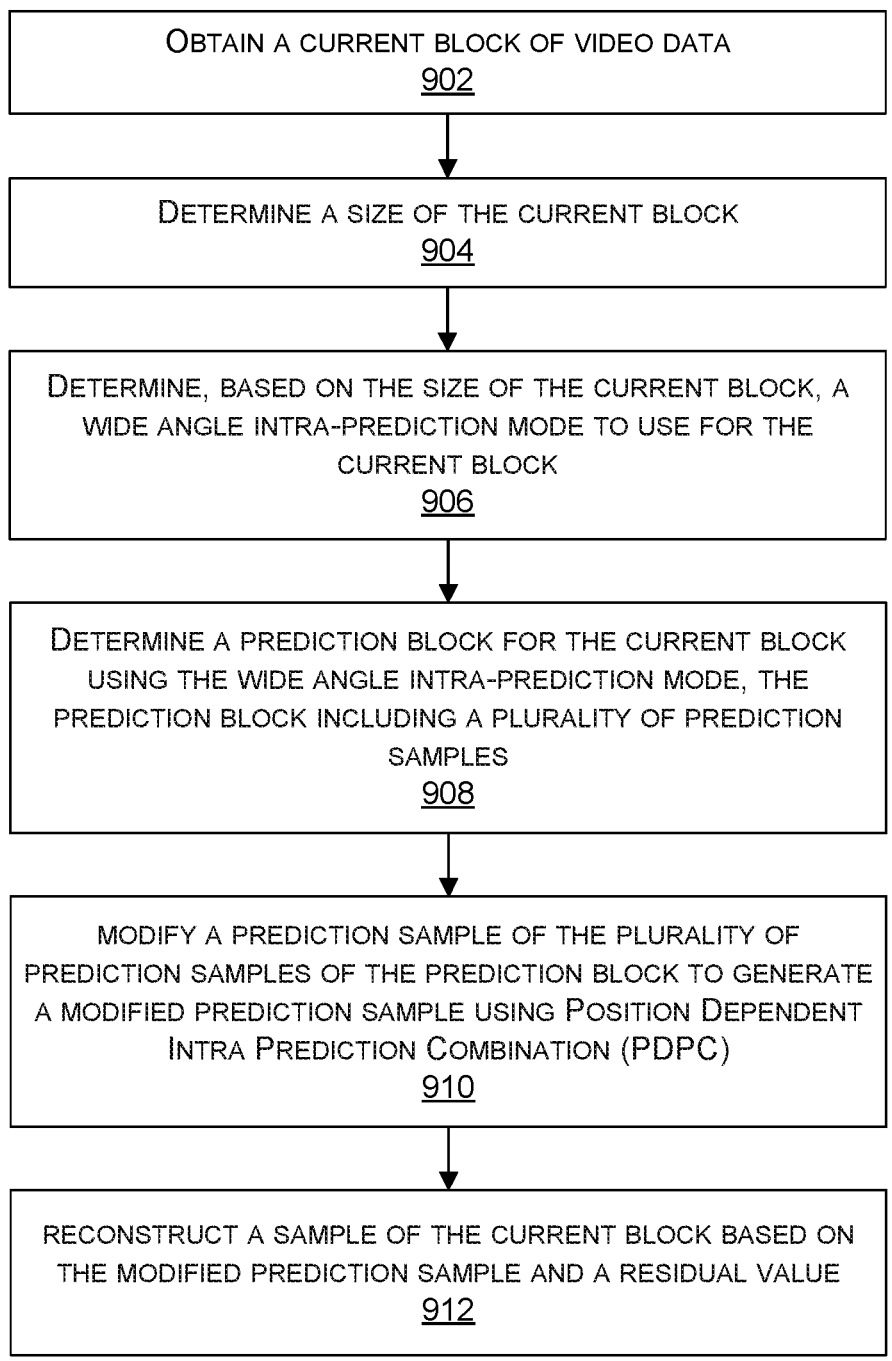
FIG. 9 is a flow diagram illustrating an example of a process for decoding video data, in accordance with some examples.

FIG. 9 is a flowchart illustrating an example of a process 900 of decoding video data using one or more of the techniques described herein. At block 902, the process 900 includes obtaining a current block of video data. In one illustrative example, the current block of video data can include the block 703 of video data shown in FIG. 7. In another illustrative example, the current block of video data can include the block 803 of video data shown in FIG. 8.

At block 904, the process 900 includes determining a size of the current block. In some cases, determining the size of the current block can include determining a width of the block and a height of the block are different sizes, indicating the block is a rectangular block. In some cases, determining the size of the current block can include determining an angle or direction of a diagonal of the current block (e.g., the diagonal direction from a bottom-left corner of the current block to a top-right corner of the current block or the diagonal direction from a top-left corner of the current block to a bottom-right corner of the current block). In some cases, a block size ratio of the current block can be used to determine the diagonal direction (e.g., using the Pythagorean Theorem—$distance_{diagonal} = \sqrt{length^2 + width^2}$). As noted above, the diagonal direction (e.g., from bottom-left to top-right or from top-left to bottom-right) can be used to determine the allowed range of prediction directions (or angles).

At block 906, the process 900 includes determining, based on the size of the current block, a wide angle intra-prediction mode to use for the current block. The wide angle intra-prediction mode is not a DC, planar, horizontal, or vertical intra-prediction mode. For instance, the angle of the wide angle intra-prediction mode can be less than −135 degrees (e.g., modes −1, −2, −3, through −14 shown in FIG. 6) or greater than to 45 degrees (e.g., modes 67, 68, 69, through 80 shown in FIG. 6) relative to the prediction sample (e.g., relative to a vertical direction from the prediction sample).

As an example implementation of block 906, a coding device (e.g., a device for decoding video data) can determine that a wide angle intra-prediction mode can be used for the current block based on the size of the current block. For instance, a wide angle intra-prediction mode can be used when it is determined that the current block is a rectangular block (the width and height are of different sizes). In some cases, any intra-prediction mode having a direction (or angle) that does not exceed the diagonal of the current block (from a bottom-left corner to a top-right corner of the block or from a top-left corner to a bottom-right corner of the block) can be selected for use in predicting the current block. In some cases, the block size ratios can be used to determine the intra-prediction mode to use. For instance, the block size ratio of a rectangular block can be used to determine the diagonal direction (e.g., from bottom-left to top-right), and therefore, the allowed range of prediction directions.

In some examples, an indication of the wide angle intra-prediction mode can be signaled in the bitstream. In some examples, the intra-prediction mode that minimizes the residual between the prediction block and the block to be encoded (e.g., based on a Sum of Absolute Errors (SAE), Sum of Absolute Differences (SAD), Sum of Absolute Transformed Differences (SATD), or other measure of similarity) can be selected for use for the current block. Using SAE as an illustrative example, the SAE for each prediction determined using each of the intra-prediction modes indicates the magnitude of the prediction error. The intra-prediction mode that has the best match to the actual current block is given by the intra-prediction mode that gives the smallest SAE. For example, the process 900 can select the wide angle intra-prediction mode based on the SAE analysis, which can indicate the wide angle intra-prediction mode as the best mode based on the current block being rectangular.

At block 908, the process 900 includes determining a prediction block for the current block using the wide angle intra-prediction mode. The prediction block includes a plurality of prediction samples. Each prediction sample can be determined using the wide-angle intra-prediction mode. At block 910, the process 900 includes modifying a prediction sample of the plurality of prediction samples of the prediction block to generate a modified prediction sample using Position Dependent Intra Prediction Combination (PDPC). For example, modifying the prediction sample can include determining one or more reference samples that are external to the current block based on the wide angle intra-prediction mode, and modifying the prediction sample to generate the modified prediction sample based on the determined one or more reference samples.

In some examples, the one or more reference samples that are external to the current block are determined using an angle of the wide angle intra-prediction mode relative to the prediction sample. For example, as shown in FIG. 7, a first PDPC reference sample 714 (denoted as $R_{(-1,y)}$) and, in some cases, a second PDPC reference sample $R_{(x,-1)}$ are determined along the direction (or angle) of the wide angle intra-prediction mode represented by the arrow 710.

In some cases, determining the one or more reference samples that are external to the current block can include determining a row that is above the current block, determining an x-coordinate in the determined row, and determining a reference sample of the one or more reference samples based on the determined row and the determined x-coordinate. In such cases, the x-coordinate in the determined row is equal to an x-coordinate of the prediction sample plus a y-coordinate of the prediction sample plus 1. Further, in some cases, determining the one or more reference samples that are external to the current block can include determining a row that is above the current block, determining the x-coordinate in the determined row (where the x-coordinate in the determined row is based on an angle of the wide angle intra-prediction mode relative to the prediction sample), and determining a reference sample of the one or more reference samples based on the determined row and the determined x-coordinate. For instance, determining the x-coordinate in the determined row can include determining one of a cotangent or tangent of the angle of the wide angle intra-prediction mode, and determining the x-coordinate in the determined row based on one of the cotangent or tangent of the angle of the wide angle intra-prediction mode, an x-coordinate of the prediction sample, and a y-coordinate of the prediction sample. In one illustrative example, with reference to FIG. 7, the second PDPC reference sample $R_{(x,-1)}$ is determined from a row of neighboring reconstructed reference samples 708. The x-coordinate of $R_{(x,-1)}$ can be determined as $x = x' + \tan(\beta) \times (y'+1)$, with $\tan(\beta)$ being the tangent of the angle θ shown in FIG. 7. In such an example, the x-coordinate (x) in the determined row (e.g., row 708 in FIG. 7) is equal to an x-coordinate of the prediction sample (x') plus a y-coordinate of the prediction sample (y') plus 1, and is also based on the angle (the tangent of the angle β, $\tan(\beta)$) of the wide angle intra-prediction mode.

In some cases, determining the one or more reference samples that are external to the current block can include determining a column that is left of the current block, determining a y-coordinate in the determined column, and determining a reference sample of the one or more reference samples based on the determined column and the determined y-coordinate. In such cases, the y-coordinate in the determined column is equal to a y-coordinate of the prediction sample plus an x-coordinate of the prediction sample plus 1. Further, in some cases, determining the one or more reference samples that are external to the current block can include determining a column that is left of the current block, determining a y-coordinate in the determined column (where the y-coordinate in the determined column is based on an angle of the wide angle intra-prediction mode), and determining a reference sample of the one or more reference samples based on the determined column and the determined y-coordinate. For instance, determining the y-coordinate in the determined column can include determining one of a cotangent or tangent of the angle of the wide angle intra-prediction mode, and determining the y-coordinate in the determined column based on one of the cotangent or tangent of the angle of the wide angle intra-prediction mode, an x-coordinate of the prediction sample, and a y-coordinate of the prediction sample. In one illustrative example, with reference to FIG. 7, the first PDPC reference sample 714 ($R_{(-1,y)}$) is determined from a column of neighboring reconstructed reference samples 706. The y-coordinate of $R_{(-1,y)}$ can be determined as y=y'+cotan($\beta$)×(x'+1), with cotan($\beta$) being the cotangent of the angle $\beta$ shown in FIG. 7. In such an example, the y-coordinate (y) in the determined column (e.g., column 706 in FIG. 7) is equal to a y-coordinate of the prediction sample (y') plus an x-coordinate of the prediction sample (x') plus 1, and is also based on the angle (the cotangent of the angle $\beta$, cotan($\beta$)) of the wide angle intra-prediction mode.

In some implementations, determining the one or more reference samples that are external to the current block based on the wide angle intra-prediction mode can include determining a set of one or more samples based on the wide angle intra-prediction mode, and at least one of interpolating, rounding with offset, or rounding without offset the set of one or more samples to generate the one or more reference samples. For example, referring to FIG. 8, interpolation can be performed on the samples 812 to generate the PDPC reference sample $R_{(x,-1)}$.

In some examples, determining the one or more reference samples that are external to the current block comprises determining the one or more reference samples having both an x-coordinate and a y-coordinate that are different than both a respective x-coordinate and y-coordinate of the prediction sample in the prediction block. For example, as described with respect to FIG. 7, a third PDPC reference sample 716 (denoted as $R_{(-1,-1)}$) can also be determined from a neighboring block that is adjacent to the top-left sample of the current block 703.

In some implementations, determining the one or more reference samples that are external to the current block based on the wide angle intra-prediction mode can include determining that one or more samples external to the current block identified based on the wide angle intra-prediction mode are not stored in a reference line buffer. The one or more reference samples can be determined based on a last reference sample stored in the reference line buffer, based on the one or more samples external to the current block not being stored in a reference line buffer.

In some aspects, the process 900 can include determining one or more weights based on x- and y-coordinates of the prediction sample. For example, as noted above, PDPC weights for an adjacent top-right diagonal mode can be determined as follows: wT=32>>((y'<<1)>>shift), wL=32>>((x'<<1)>>shift), wTL=0 or wT=32>>((y'<<1)>>shift), wL=0, wTL=0. In another example, as noted above, PDPC weights for an adjacent bottom-left diagonal mode can be determined as follows: wL=32>>((x'<<1)>>shift), wT=32>>((y'<<1)>>shift), wTL=0 or wL=32>>((x'<<1)>>shift), wT=0, wTL=0. The determined one or more weights can be used to modify the prediction sample along with the one or more reference samples. For instance, the modified prediction sample can be generated based on the determined one or more reference samples, the determined one or more weights, and the prediction sample (e.g., using Equation 1 from above).

In some examples, modifying the prediction sample of the plurality of prediction samples of the prediction block can include modifying a first prediction sample of the prediction block. For example, the one or more reference samples can include a first set of one or more reference samples, and the process 900 can include determining, for a second prediction sample of the prediction block, that at least one reference sample of a second set of one or more reference samples for the second prediction sample are not stored in a reference line buffer. In some cases, PDPC may not be applied to the second prediction sample based on determining, for the second prediction sample, that the at least one reference sample of the second set of one or more reference samples for the second prediction sample are not stored in a reference line buffer. In some cases, PDPC can be applied to the second prediction sample using only reference samples available in reference line buffer based on determining, for the second prediction sample, that the at least one reference sample of the second set of one or more reference samples for the second prediction sample are not stored in a reference line buffer.

At block 912, the process 900 includes reconstructing a sample of the current block based on the modified prediction sample and a residual value. For example, as described above, a device for decoding video data can determine a residual value of a residual block based on received information and can add the residual values of the residual block to the prediction samples of the prediction block to reconstruct the current block. The device for decoding video data can receive the information for the residual value (e.g., coefficients for residual transform blocks in the bitstream), and can reconstruct the sample by adding the residual value to the modified prediction sample (modified using PDPC) to reconstruct the sample in the current block.

Figure 10:
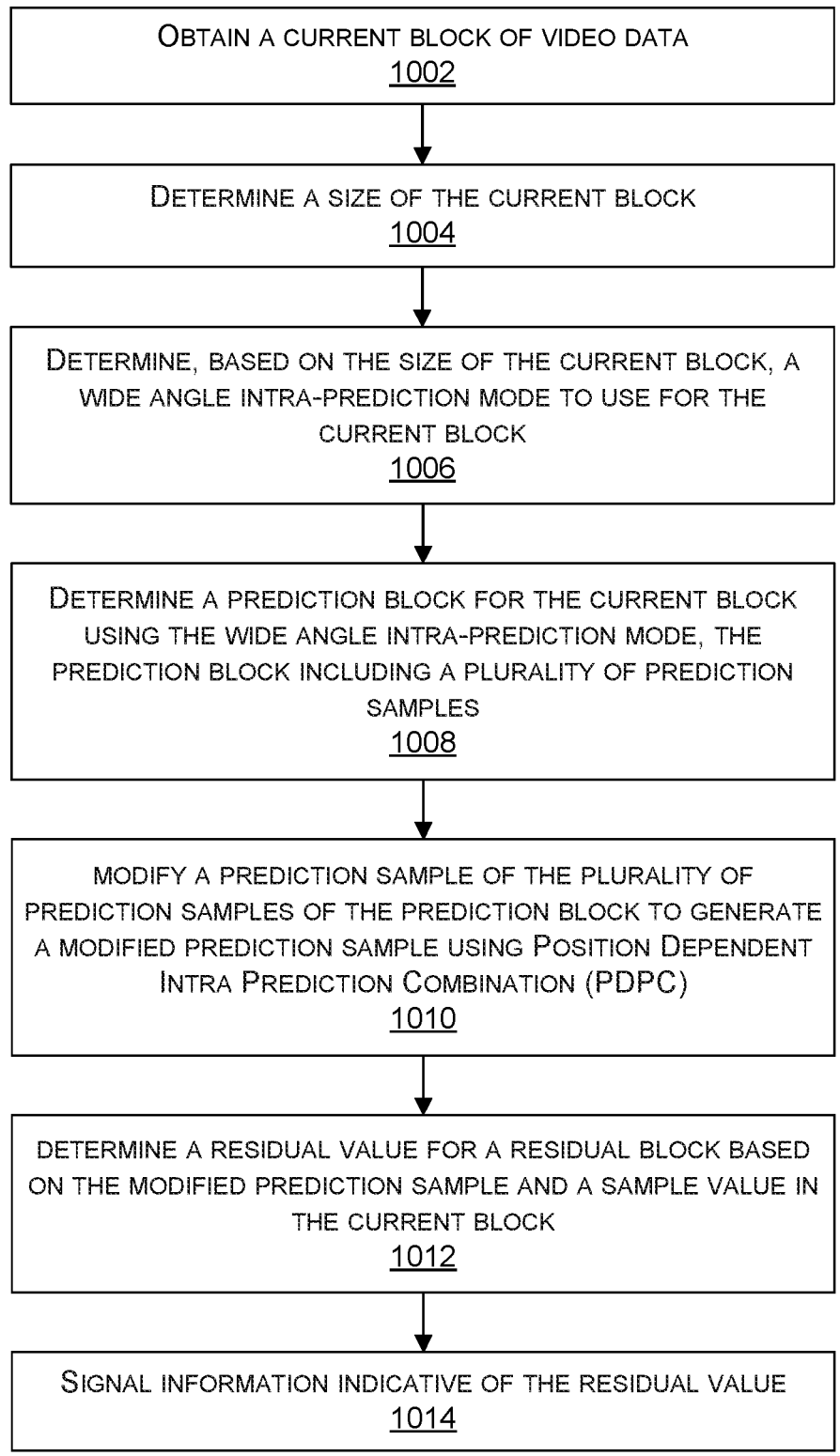
FIG. 10 is a flow diagram illustrating an example of a process for encoding video data, in accordance with some examples.

FIG. 10 is a flowchart illustrating an example of a process 1000 of encoding video data using one or more of the techniques described herein. At block 1002, the process 1000 includes obtaining a current block of video data. In one illustrative example, the current block of video data can include the block 703 of video data shown in FIG. 7. In another illustrative example, the current block of video data can include the block 803 of video data shown in FIG. 8.

At block 1004, the process 1000 includes determining a size of the current block. In some cases, determining the size of the current block can include determining a width of the block and a height of the block are different sizes, indicating the block is a rectangular block. In some cases, determining the size of the current block can include determining an angle or direction of a diagonal of the current block (e.g., the diagonal direction from a bottom-left corner of the current block to a top-right corner of the current block or the diagonal direction from a top-left corner of the current block to a bottom-right corner of the current block). In some cases, a block size ratio of the current block can be used to determine the diagonal direction (e.g., using the Pythagorean Theorem—$distance_{diagonal}=\sqrt{length^2+width^2}$). As noted above, the diagonal direction (e.g., from bottom-left to top-right or from top-left to bottom-right) can be used to determine the allowed range of prediction directions (or angles).

At block 1006, the process 1000 includes determining, based on the size of the current block, a wide angle intra-prediction mode to use for the current block. The wide angle intra-prediction mode is not a DC, planar, horizontal, or vertical intra-prediction mode. For instance, the angle of the wide angle intra-prediction mode can be less than −135 degrees (e.g., modes −1, −2, −3, through −14 shown in FIG. 6) or greater than to 45 degrees (e.g., modes 67, 68, 69, through 80 shown in FIG. 6) relative to the prediction sample (e.g., relative to a vertical direction from the prediction sample).

As an example implementation of block 1006, a coding device (e.g., a device for encoding video data) can determine that a wide angle intra-prediction mode can be used for the current block based on the size of the current block. For instance, a wide angle intra-prediction mode can be used when it is determined that the current block is a rectangular block (the width and height are of different sizes). In some cases, any intra-prediction mode having a direction (or angle) that does not exceed the diagonal of the current block (from a bottom-left corner to a top-right corner of the block or from a top-left corner to a bottom-right corner of the block) can be selected for use in predicting the current block. In some cases, the block size ratios can be used to determine the intra-prediction mode to use. For instance, the block size ratio of a rectangular block can be used to determine the diagonal direction (e.g., from bottom-left to top-right), and therefore, the allowed range of prediction directions. The intra-prediction mode that minimizes the residual between the prediction block and the block to be encoded (e.g., based on a Sum of Absolute Errors (SAE), Sum of Absolute Differences (SAD), Sum of Absolute Transformed Differences (SATD), or other measure of similarity) can be selected for use for the current block. Using SAE as an illustrative example, the SAE for each prediction determined using each of the intra-prediction modes indicates the magnitude of the prediction error. The intra-prediction mode that has the best match to the actual current block is given by the intra-prediction mode that gives the smallest SAE. For example, the process 900 can select the wide angle intra-prediction mode based on the SAE analysis, which can indicate the wide angle intra-prediction mode as the best mode based on the current block being rectangular.

At block 1008, the process 1000 includes determining a prediction block for the current block using the wide angle intra-prediction mode. The prediction block includes a plurality of prediction samples. The prediction block includes a plurality of prediction samples. Each prediction sample can be determined using the wide-angle intra-prediction mode. At block 1010, the process 1000 includes modifying a prediction sample of the plurality of prediction samples of the prediction block to generate a modified prediction sample using Position Dependent Intra Prediction Combination (PDPC). For example, modifying the prediction sample can include determining one or more reference samples that are external to the current block based on the wide angle intra-prediction mode, and modifying the prediction sample to generate the modified prediction sample based on the determined one or more reference samples.

In some examples, the one or more reference samples that are external to the current block are determined using an angle of the wide angle intra-prediction mode relative to the prediction sample. For example, as shown in FIG. 7, a first PDPC reference sample 714 (denoted as $R_{(-1,y)}$) and, in some cases, a second PDPC reference sample $R_{(x,-1)}$ are determined along the direction (or angle) of the wide angle intra-prediction mode represented by the arrow 710.

In some cases, determining the one or more reference samples that are external to the current block can include determining a row that is above the current block, determining an x-coordinate in the determined row, and determining a reference sample of the one or more reference samples based on the determined row and the determined x-coordinate. In such cases, the x-coordinate in the determined row is equal to an x-coordinate of the prediction sample plus a y-coordinate of the prediction sample plus 1. Further, in some cases, determining the one or more reference samples that are external to the current block can include determining a row that is above the current block, determining the x-coordinate in the determined row (where the x-coordinate in the determined row is based on an angle of the wide angle intra-prediction mode relative to the prediction sample), and determining a reference sample of the one or more reference samples based on the determined row and the determined x-coordinate. For instance, determining the x-coordinate in the determined row can include determining one of a cotangent or tangent of the angle of the wide angle intra-prediction mode, and determining the x-coordinate in the determined row based on one of the cotangent or tangent of the angle of the wide angle intra-prediction mode, an x-coordinate of the prediction sample, and a y-coordinate of the prediction sample. In one illustrative example, with reference to FIG. 7, the second PDPC reference sample $R_{(x,-1)}$ is determined from a row of neighboring reconstructed reference samples 708. The x-coordinate of $R_{(x,-1)}$ can be determined as $x=x'+\tan(\beta)\times(y'+1)$, with $\tan(\beta)$ being the tangent of the angle β shown in FIG. 7. In such an example, the x-coordinate (x) in the determined row (e.g., row 708 in FIG. 7) is equal to an x-coordinate of the prediction sample (x') plus a y-coordinate of the prediction sample (y') plus 1, and is also based on the angle (the tangent of the angle β, $\tan(\beta)$) of the wide angle intra-prediction mode.

In some cases, determining the one or more reference samples that are external to the current block can include determining a column that is left of the current block, determining a y-coordinate in the determined column, and determining a reference sample of the one or more reference samples based on the determined column and the determined y-coordinate. In such cases, the y-coordinate in the determined column is equal to a y-coordinate of the prediction sample plus an x-coordinate of the prediction sample plus 1. Further, in some cases, determining the one or more reference samples that are external to the current block can include determining a column that is left of the current block, determining a y-coordinate in the determined column (where the y-coordinate in the determined column is based on an angle of the wide angle intra-prediction mode), and determining a reference sample of the one or more reference samples based on the determined column and the determined y-coordinate. For instance, determining the y-coordinate in the determined column can include determining one of a cotangent or tangent of the angle of the wide angle intra-prediction mode, and determining the y-coordinate in the determined column based on one of the cotangent or tangent of the angle of the wide angle intra-prediction mode, an x-coordinate of the prediction sample, and a y-coordinate of the prediction sample. In one illustrative example, with reference to FIG. 7, the first PDPC reference sample 714 ($R_{(-1,y)}$) is determined from a column of neighboring reconstructed reference samples 706. The y-coordinate of $R_{(-1,y)}$ can be determined as $y=y'+\cot(\beta)\times(x'+1)$, with $\cot(\beta)$ being the cotangent of the angle β shown in FIG. 7. In such an example, the y-coordinate (y) in the determined column (e.g., column 706 in FIG. 7) is equal to a y-coordinate of the prediction sample (y') plus an x-coordinate of the prediction sample (x') plus 1, and is also based on the angle (the cotangent of the angle β, cotan(β)) of the wide angle intra-prediction mode.

In some implementations, determining the one or more reference samples that are external to the current block based on the wide angle intra-prediction mode can include determining a set of one or more samples based on the wide angle intra-prediction mode, and at least one of interpolating, rounding with offset, or rounding without offset the set of one or more samples to generate the one or more reference samples. For example, referring to FIG. 8, interpolation can be performed on the samples 812 to generate the PDPC reference sample $R_{(x,-1)}$.

In some examples, determining the one or more reference samples that are external to the current block comprises determining the one or more reference samples having both an x-coordinate and a y-coordinate that are different than both a respective x-coordinate and y-coordinate of the prediction sample in the prediction block. For example, as described with respect to FIG. 7, a third PDPC reference sample 716 (denoted as $R_{(-1,-1)}$) can also be determined from a neighboring block that is adjacent to the top-left sample of the current block 703.

In some implementations, determining the one or more reference samples that are external to the current block based on the wide angle intra-prediction mode can include determining that one or more samples external to the current block identified based on the wide angle intra-prediction mode are not stored in a reference line buffer. The one or more reference samples can be determined based on a last reference sample stored in the reference line buffer, based on the one or more samples external to the current block not being stored in a reference line buffer.

In some aspects, the process 900 can include determining one or more weights based on x- and y-coordinates of the prediction sample. For example, as noted above, PDPC weights for an adjacent top-right diagonal mode can be determined as follows: wT=32>>((y'<<1)>>shift), wL=32>>((x'<<1)>>shift), wTL=0 or wT=32>>((y'<<1)>>shift), wL=0, wTL=0. In another example, as noted above, PDPC weights for an adjacent bottom-left diagonal mode can be determined as follows: wL=32>>((x'<<1)>>shift), wT=32>>((y'<<1)>>shift), wTL=0 or wL=32>>((x'<<1)>>shift), wT=0, wTL=0. The determined one or more weights can be used to modify the prediction sample along with the one or more reference samples. For instance, the modified prediction sample can be generated based on the determined one or more reference samples, the determined one or more weights, and the prediction sample (e.g., using Equation 1 from above).

In some examples, modifying the prediction sample of the plurality of prediction samples of the prediction block can include modifying a first prediction sample of the prediction block. For example, the one or more reference samples can include a first set of one or more reference samples, and the process 900 can include determining, for a second prediction sample of the prediction block, that at least one reference sample of a second set of one or more reference samples for the second prediction sample are not stored in a reference line buffer. In some cases, PDPC may not be applied to the second prediction sample based on determining, for the second prediction sample, that the at least one reference sample of the second set of one or more reference samples for the second prediction sample are not stored in a reference line buffer. In some cases, PDPC can be applied to the second prediction sample using only reference samples available in reference line buffer based on determining, for the second prediction sample, that the at least one reference sample of the second set of one or more reference samples for the second prediction sample are not stored in a reference line buffer.

At block 1012, the process 1000 includes determining a residual value for a residual block based on the modified prediction sample and a sample value in the current block. For example, the residual value can include a difference (or error) between the modified prediction sample and the sample value in the current block. A transform block (e.g., a TU, TB, or the like) with residual values and/or transform coefficients can be generated based on one or more residual values determined for the current block. For example, the residual data can be transformed from the pixel domain to a transform domain, resulting in residual transform coefficients. The residual transform coefficients can be quantized, and in some cases, entropy coding may be applied to the quantized transform coefficients. At block 1014, the process 1000 includes signaling information indicative of the residual value. The information can include a residual transform block (which may be entropy coded), residual transform coefficients, quantized residual transform coefficients, or entropy coded quantized residual transform coefficients.

In some examples, the processes 900 and 1000 may be performed by a computing device or an apparatus. For example, the process 900 can be performed by the video decoder 30, or by a device or apparatus (e.g., a camera, a computer, a mobile device, a broadcast receiver device, or a set-top box) for decoding video data that includes the video decoder 30. In another example, the process 1000 can be performed by the video encoder 22, or by a device or apparatus (e.g., a camera, a computer, a mobile device, a broadcast receiver device, or a set-top box) for encoding video data that includes the video encoder 22. In some cases, the computing device or apparatus may include a processor, microprocessor, microcomputer, or other component of a device that is configured to carry out the steps of one or both of the processes 900 and 1000. In some examples, the computing device or apparatus may include one or more components, such as one or more cameras for capturing one or more images, an input device (e.g., a touchscreen interface, a keypad, a mouse, or other input device), an output device (e.g., a display for displaying the current block, one or more images, notifications, and/or other displayable data, a speaker for outputting audio, or other output device), any combination thereof, or other suitable component. In some examples, the computing device may include a desktop computer, a notebook (i.e., laptop) computer, a tablet computer, a set-top box, a telephone handset such as a so-called "smart" phone, a television, a camera, a display device, a digital media player, a video gaming console, a video streaming device, a wearable device, or the like, or other device with the one or more components. In some cases, the computing device may include a video codec. In some examples, some of the one or more components can be separate from the computing device, in which case the computing device receives the data or transmits the data. The computing device may further include a network interface configured to communicate data. The network interface may be configured to communicate Internet Protocol (IP) based data or other suitable network data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes 900 and 1000 are illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes 900 and 1000 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
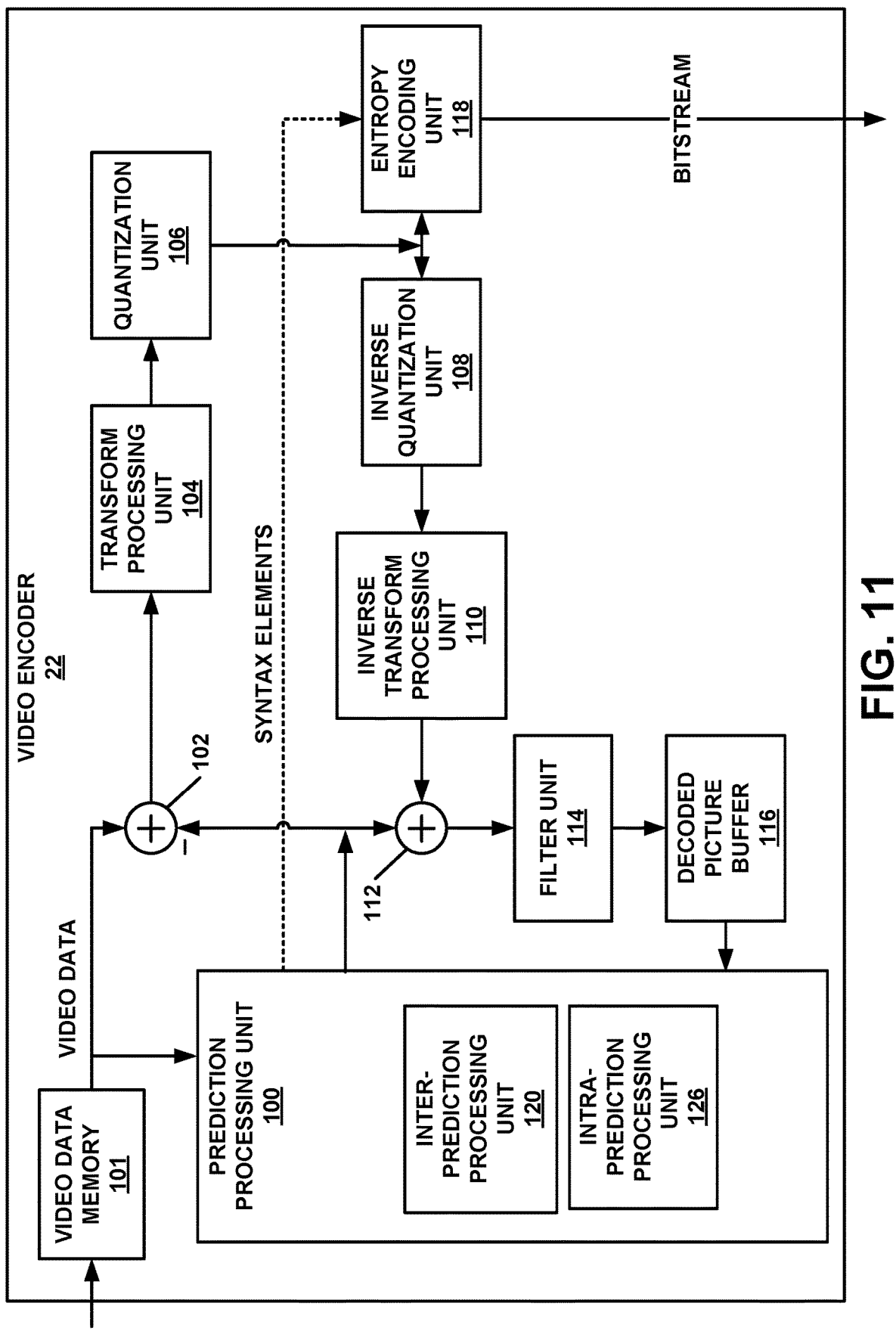
FIG. 11 is a block diagram illustrating an example of a video encoder, in accordance with some examples.

FIG. 11 is a block diagram illustrating an example video encoder 22 that may implement the techniques of this disclosure. FIG. 11 is provided for purposes of explanation and should not be considered limiting of the techniques as broadly exemplified and described in this disclosure. The techniques of this disclosure may be applicable to various coding standards or methods.

In the example of FIG. 11, video encoder 22 includes a prediction processing unit 100, video data memory 101, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Inter-prediction processing unit 120 may include a motion estimation unit and a motion compensation unit (not shown).

Video data memory 101 may be configured to store video data to be encoded by the components of video encoder 22. The video data stored in video data memory 101 may be obtained, for example, from video source 18. Decoded picture buffer 116 may be a reference picture memory that stores reference video data for use in encoding video data by video encoder 22, e.g., in intra- or inter-coding modes. Video data memory 101 and decoded picture buffer 116 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 101 and decoded picture buffer 116 may be provided by the same memory device or separate memory devices. In various examples, video data memory 101 may be on-chip with other components of video encoder 22, or off-chip relative to those components. Video data memory 101 may be the same as or part of storage media 20 of FIG. 1.

Video encoder 22 receives video data. Video encoder 22 may encode each CTU in a slice of a picture of the video data. Each of the CTUs may be associated with equally-sized luma CTBs and corresponding CTBs of the picture. As part of encoding a CTU, prediction processing unit 100 may perform partitioning to divide the CTBs of the CTU into progressively-smaller blocks. The smaller blocks may be coding blocks of CUs. For example, prediction processing unit 100 may partition a CTB associated with a CTU according to a tree structure. In accordance with one or more techniques of this disclosure, for each respective non-leaf node of the tree structure at each depth level of the tree structure, there are a plurality of allowed splitting patterns for the respective non-leaf node and the video block corresponding to the respective non-leaf node is partitioned into video blocks corresponding to the child nodes of the respective non-leaf node according to one of the plurality of allowable splitting patterns. In one example, prediction processing unit 100 or another processing unit of video encoder 22 may be configured to perform any combination of the techniques described herein.

Video encoder 22 may encode CUs of a CTU to generate encoded representations of the CUs (i.e., coded CUs). As part of encoding a CU, prediction processing unit 100 may partition the coding blocks associated with the CU among one or more PUs of the CU. In accordance with techniques of this disclosure, a CU may only include a single PU. That is, in some examples of this disclosure, a CU is not divided into separate prediction blocks, but rather, a prediction process is performed on the entire CU. Thus, each CU may be associated with a luma prediction block and corresponding chroma prediction blocks. Video encoder 22 and video decoder 30 may support CUs having various sizes. As indicated above, the size of a CU may refer to the size of the luma coding block of the CU also the size of a luma prediction block. As discussed above, video encoder 22 and video decoder 30 may support CU sizes defined by any combination of the example partitioning techniques described herein.

Inter-prediction processing unit 120 may generate predictive data for a PU by performing inter prediction on each PU of a CU. As explained herein, in some examples of this disclosure, a CU may contain only a single PU, that is, the CU and PU may be synonymous. The predictive data for the PU may include predictive blocks of the PU and motion information for the PU. Inter-prediction processing unit 120 may perform different operations for a PU or a CU depending on whether the PU is in an I slice, a P slice, or a B slice. In an I slice, all PUs are intra predicted. Hence, if the PU is in an I slice, inter-prediction processing unit 120 does not perform inter prediction on the PU. Thus, for blocks encoded in I-mode, the predicted block is formed using spatial prediction from previously-encoded neighboring blocks within the same frame. If a PU is in a P slice, inter-prediction processing unit 120 may use uni-directional inter prediction to generate a predictive block of the PU. If a PU is in a B slice, inter-prediction processing unit 120 may use uni-directional or bi-directional inter prediction to generate a predictive block of the PU.

Intra-prediction processing unit 126 may generate predictive data for a PU by performing intra prediction on the PU. The predictive data for the PU may include predictive blocks of the PU and various syntax elements. Intra-prediction processing unit 126 may perform intra prediction on PUs in I slices, P slices, and B slices.

To perform intra prediction on a PU, intra-prediction processing unit 126 may use multiple intra-prediction modes to generate multiple sets of predictive data for the PU. Intra-prediction processing unit 126 may use samples from sample blocks of neighboring PUs to generate a predictive block for a PU. The neighboring PUs may be above, above and to the right, above and to the left, or to the left of the PU, assuming a left-to-right, top-to-bottom encoding order for PUs, CUs, and CTUs. Intra-prediction processing unit 126 may use various numbers of intra-prediction modes, e.g., 33 directional intra-prediction modes. In some examples, the number of intra-prediction modes may depend on the size of the region associated with the PU.

In one example, Intra-prediction processing unit 126 may be configured to implement techniques of the disclosure. In other examples, other units or modules may be configured to implement all or some of the techniques of the disclosure.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks.

Residual generation unit 102 may generate, based on the coding blocks (e.g., luma, Cb and Cr coding blocks) for a CU and the selected predictive blocks (e.g., predictive luma, Cb and Cr blocks) for the PUs of the CU, residual blocks (e.g., luma, Cb and Cr residual blocks) for the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU.

Transform processing unit 104 may perform quad-tree partitioning to partition the residual blocks associated with a CU into transform blocks associated with TUs of the CU. Thus, a TU may be associated with a luma transform block and two chroma transform blocks. The sizes and positions of the luma and chroma transform blocks of TUs of a CU may or may not be based on the sizes and positions of prediction blocks of the PUs of the CU. A quad-tree structure known as a "residual quad-tree" (RQT) may include nodes associated with each of the regions. The TUs of a CU may correspond to leaf nodes of the RQT. In other examples, transform processing unit 104 may be configured to partition TUs in accordance with the partitioning techniques described herein. For example, video encoder 22 may not further divide CUs into TUs using an RQT structure. As such, in one example, a CU includes a single TU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually similar transform to a transform block. In some examples, transform processing unit 104 does not apply transforms to a transform block. In such examples, the transform block may be treated as a transform coefficient block.

Quantization unit 106 may quantize the transform coefficients in a coefficient block. The quantization process may reduce the bit depth associated with some or all of the transform coefficients. For example, an n-bit transform coefficient may be rounded down to an m-bit transform coefficient during quantization, where n is greater than m. Quantization unit 106 may quantize a coefficient block associated with a TU of a CU based on a quantization parameter (QP) value associated with the CU. Video encoder 22 may adjust the degree of quantization applied to the coefficient blocks associated with a CU by adjusting the QP value associated with the CU. Quantization may introduce loss of information. Thus, quantized transform coefficients may have lower precision than the original ones.

Inverse quantization unit 108 and inverse transform processing unit 110 may apply inverse quantization and inverse transforms to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. By reconstructing transform blocks for each TU of a CU in this way, video encoder 22 may reconstruct the coding blocks of the CU.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. Inter-prediction processing unit 120 may use a reference picture that contains the reconstructed coding blocks to perform inter prediction on PUs of other pictures. In addition, intra-prediction processing unit 126 may use reconstructed coding blocks in decoded picture buffer 116 to perform intra prediction on other PUs in the same picture as the CU.

Entropy encoding unit 118 may receive data from other functional components of video encoder 22. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, entropy encoding unit 118 may perform a CABAC operation, a context-adaptive variable length coding (CAVLC) operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 22 may output a bitstream that includes entropy-encoded data generated by entropy encoding unit 118. For instance, the bitstream may include data that represents the partition structure for a CU according to the techniques of this disclosure.

Figure 12:
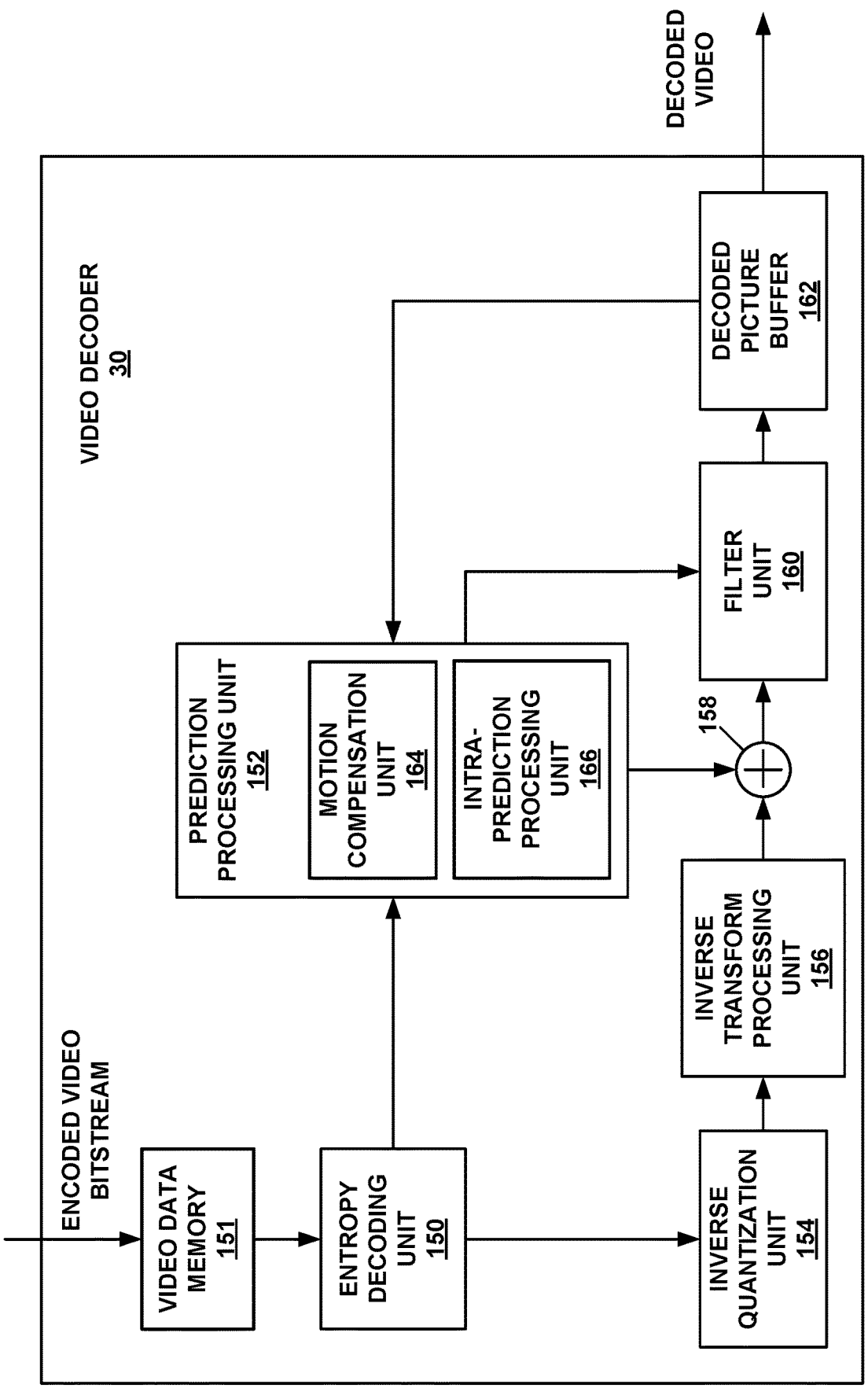
FIG. 12 is a block diagram illustrating an example of a video decoder, in accordance with some examples.

FIG. 12 is a block diagram illustrating an example video decoder 30 that is configured to implement the techniques of this disclosure. FIG. 12 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 12, video decoder 30 includes an entropy decoding unit 150, video data memory 151, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. In other examples, video decoder 30 may include more, fewer, or different functional components.

Video data memory 151 may store encoded video data, such as an encoded video bitstream, to be decoded by the components of video decoder 30. The video data stored in video data memory 151 may be obtained, for example, from computer-readable medium 16, e.g., from a local video source, such as a camera, via wired or wireless network communication of video data, or by accessing physical data storage media. Video data memory 151 may form a coded picture buffer (CPB) that stores encoded video data from an encoded video bitstream. Decoded picture buffer 162 may be a reference picture memory that stores reference video data for use in decoding video data by video decoder 30, e.g., in intra- or inter-coding modes, or for output. Video data memory 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 151 and decoded picture buffer 162 may be provided by the same memory device or separate memory devices. In various examples, video data memory 151 may be on-chip with other components of video decoder 30, or off-chip relative to those components. Video data memory 151 may be the same as or part of storage media 28 of FIG. 1.

Video data memory 151 receives and stores encoded video data (e.g., NAL units) of a bitstream. Entropy decoding unit 150 may receive encoded video data (e.g., NAL units) from video data memory 151 and may parse the NAL units to obtain syntax elements. Entropy decoding unit 150 may entropy decode entropy-encoded syntax elements in the NAL units. Prediction processing unit 152, inverse quantization unit 154, inverse transform processing unit 156, reconstruction unit 158, and filter unit 160 may generate decoded video data based on the syntax elements extracted from the bitstream. Entropy decoding unit 150 may perform a process generally reciprocal to that of entropy encoding unit 118.

In accordance with some examples of this disclosure, entropy decoding unit 150, or another processing unit of video decoder 30, may determine a tree structure as part of obtaining the syntax elements from the bitstream. The tree structure may specify how an initial video block, such as a CTB, is partitioned into smaller video blocks, such as coding units. In accordance with one or more techniques of this disclosure, for each respective non-leaf node of the tree structure at each depth level of the tree structure, there are a plurality of allowed partition types for the respective non-leaf node and the video block corresponding to the respective non-leaf node is partitioned into video blocks corresponding to the child nodes of the respective non-leaf node according to one of the plurality of allowable splitting patterns.

In addition to obtaining syntax elements from the bitstream, video decoder 30 may perform a reconstruction operation on a non-partitioned CU. To perform the reconstruction operation on a CU, video decoder 30 may perform a reconstruction operation on each TU of the CU. By performing the reconstruction operation for each TU of the CU, video decoder 30 may reconstruct residual blocks of the CU. As discussed above, in one example of the disclosure, a CU includes a single TU.

As part of performing a reconstruction operation on a TU of a CU, inverse quantization unit 154 may inverse quantize, i.e., de-quantize, coefficient blocks associated with the TU. After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a CU or PU is encoded using intra prediction, intra-prediction processing unit 166 may perform intra prediction to generate predictive blocks of the PU. Intra-prediction processing unit 166 may use an intra-prediction mode to generate the predictive blocks of the PU based on samples spatially-neighboring blocks. Intra-prediction processing unit 166 may determine the intra-prediction mode for the PU based on one or more syntax elements obtained from the bitstream.

In one example, Intra-prediction processing unit 166 may be configured to implement techniques of the disclosure. In other examples, other units or modules may be configured to implement all or some of the techniques of the disclosure.

If a PU is encoded using inter prediction, entropy decoding unit 150 may determine motion information for the PU. Motion compensation unit 164 may determine, based on the motion information of the PU, one or more reference blocks. Motion compensation unit 164 may generate, based on the one or more reference blocks, predictive blocks (e.g., predictive luma, Cb and Cr blocks) for the PU. As discussed above, a CU may include only a single PU. That is, a CU may not be divided into multiple PUs.

Reconstruction unit 158 may use transform blocks (e.g., luma, Cb and Cr transform blocks) for TUs of a CU and the predictive blocks (e.g., luma, Cb and Cr blocks) of the PUs of the CU, i.e., either intra-prediction data or inter-prediction data, as applicable, to reconstruct the coding blocks (e.g., luma, Cb and Cr coding blocks) for the CU. For example, reconstruction unit 158 may add samples of the transform blocks (e.g., luma, Cb and Cr transform blocks) to corresponding samples of the predictive blocks (e.g., luma, Cb and Cr predictive blocks) to reconstruct the coding blocks (e.g., luma, Cb and Cr coding blocks) of the CU.

Filter unit 160 may perform a deblocking operation to reduce blocking artifacts associated with the coding blocks of the CU. Video decoder 30 may store the coding blocks of the CU in decoded picture buffer 162. Decoded picture buffer 162 may provide reference pictures for subsequent motion compensation, intra prediction, and presentation on a display device, such as display device 32 of FIG. 1. For instance, video decoder 30 may perform, based on the blocks in decoded picture buffer 162, intra prediction or inter prediction operations for PUs of other CUs.

The video decoder outputs a decoded version of the current picture that includes a decoded version of the current block. When the video decoder is a video decoder configured to output displayable decoded video, then the video decoder may, for example, output the decoded version of the current picture to a display device. When the decoding is performed as part of a decoding loop of a video encoding process, then the video decoder may store the decoded version of the current picture as a reference picture for use in encoding another picture of the video data.

Certain aspects of this disclosure have been described with respect to extensions of the HEVC standard for purposes of illustration. However, the techniques described in this disclosure may be useful for other video coding processes, including other standard or proprietary video coding processes not yet developed.

A video coder, as described in this disclosure, may refer to a video encoder or a video decoder. Similarly, a video coding unit may refer to a video encoder or a video decoder. Likewise, video coding may refer to video encoding or video decoding, as applicable. In this disclosure, the phrase "based on" may indicate based only on, based at least in part on, or based in some way on. This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions. Example types of video blocks may include coding tree blocks, coding blocks, and other types of blocks of video data.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of decoding video data, the method comprising:
   determining a size of a current block of video data;
   determining, based on the size of the current block, a wide angle intra-prediction mode to use for the current block;
   determining a prediction block for the current block using the wide angle intra-prediction mode, the prediction block including a plurality of intra-predicted prediction samples determined using an angle of the wide angle intra-prediction mode;

determining one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;

modifying, using the one or more PDPC reference samples, an intra-predicted prediction sample of the plurality of intra-predicted prediction samples of the prediction block to generate a modified prediction sample; and reconstructing a block based on the modified prediction sample and a residual value.

2. The method of claim 1, wherein determining the size of the current block includes determining a width of the current block and a height of the current block are different sizes.

3. The method of claim 1, wherein the angle of the wide angle intra-prediction mode is less than −135 degrees or greater than to 45 degrees relative to the intra-predicted prediction sample.

4. The method of claim 1, further comprising:
determining one or more weights based on x- and y-coordinates of the intra-predicted prediction sample, wherein modifying the intra-predicted prediction sample comprises modifying the intra-predicted prediction sample to generate the modified prediction sample based on the one or more PDPC reference samples, the one or more weights, and the intra-predicted prediction sample.

5. The method of claim 1, wherein determining the one or more PDPC reference samples that are external to the current block comprises determining the one or more PDPC reference samples having both an x-coordinate and a y-coordinate that are different than both a respective x-coordinate and y-coordinate of the intra-predicted prediction sample in the prediction block.

6. The method of claim 1, wherein determining the one or more PDPC reference samples that are external to the current block comprises:
determining a row that is above the current block;
determining an x-coordinate in the determined row, wherein the x-coordinate in the determined row is equal to an x-coordinate of the intra-predicted prediction sample plus a y-coordinate of the intra-predicted prediction sample plus 1; and
determining a PDPC reference sample of the one or more PDPC reference samples based on the determined row and the determined x-coordinate.

7. The method of claim 1, wherein determining the one or more PDPC reference samples that are external to the current block comprises:
determining a column that is left of the current block;
determining a y-coordinate in the determined column, wherein the y-coordinate in the determined column is equal to a y-coordinate of the intra-predicted prediction sample plus an x-coordinate of the intra-predicted prediction sample plus 1; and
determining a PDPC reference sample of the one or more PDPC reference samples based on the determined column and the determined y-coordinate.

8. The method of claim 1, wherein determining the one or more PDPC reference samples that are external to the current block comprises:
determining a row that is above the current block;
determining an x-coordinate in the determined row, wherein the x-coordinate in the determined row is based on an angle of the wide angle intra-prediction mode relative to the intra-predicted prediction sample; and
determining a PDPC reference sample of the one or more PDPC reference samples based on the determined row and the determined x-coordinate.

9. The method of claim 8, wherein determining the x-coordinate in the determined row comprises:
determining one of a cotangent or tangent of the angle of the wide angle intra-prediction mode; and
determining the x-coordinate in the determined row based on one of the cotangent or tangent of the angle of the wide angle intra-prediction mode, an x-coordinate of the intra-predicted prediction sample, and a y-coordinate of the intra-predicted prediction sample.

10. The method of claim 1, wherein determining the one or more PDPC reference samples that are external to the current block comprises:
determining a column that is left of the current block;
determining a y-coordinate in the determined column, wherein the y-coordinate in the determined column is based on an angle of the wide angle intra-prediction mode; and
determining a PDPC reference sample of the one or more PDPC reference samples based on the determined column and the determined y-coordinate.

11. The method of claim 10, wherein determining the y-coordinate in the determined column comprises:
determining one of a cotangent or tangent of the angle of the wide angle intra-prediction mode; and
determining the y-coordinate in the determined column based on one of the cotangent or tangent of the angle of the wide angle intra-prediction mode, an x-coordinate of the intra-predicted prediction sample, and a y-coordinate of the intra-predicted prediction sample.

12. The method of claim 1, wherein determining the one or more PDPC reference samples that are external to the current block based on the wide angle intra-prediction mode comprises:
determining a set of one or more samples based on the wide angle intra-prediction mode; and
at least one of interpolating, rounding with offset, or rounding without offset the set of one or more samples to generate the one or more PDPC reference samples.

13. The method of claim 1, wherein determining the one or more PDPC reference samples that are external to the current block based on the wide angle intra-prediction mode comprises:
determining that one or more samples external to the current block identified based on the wide angle intra-prediction mode are not stored in a reference line buffer; and
determining the one or more PDPC reference samples based on a last PDPC reference sample stored in the reference line buffer.

14. The method of claim 1, wherein modifying the intra-predicted prediction sample of the plurality of intra-predicted prediction samples of the prediction block comprises modifying a first intra-predicted prediction sample of the prediction block, and wherein the one or more PDPC reference samples comprise a first set of one or more PDPC reference samples, the method further comprising:
determining, for a second intra-predicted prediction sample of the prediction block, that at least one PDPC reference sample of a second set of one or more PDPC reference samples for the second intra-predicted prediction sample are not stored in a reference line buffer; and one of not applying PDPC to the second intra-predicted prediction sample or applying PDPC using only PDPC reference samples available in reference line buffer.

15. The method of claim 1, wherein the wide angle intra-prediction mode is not a DC, planar, horizontal, or vertical intra-prediction mode.

16. A method of encoding video data, the method comprising:
determining a size of a current block of video data;
determining, based on the size of the current block, a wide angle intra-prediction mode to use for the current block;
determining a prediction block for the current block using the wide angle intra-prediction mode, the prediction block including a plurality of intra-predicted prediction samples determined using an angle of the wide angle intra-prediction mode;
determining one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;
modifying, using the one or more PDPC reference samples, an intra-predicted prediction sample of the plurality of intra-predicted prediction samples of the prediction block to generate a modified prediction sample;
determining a residual value for a residual block based on the modified prediction sample and a sample value in the current block; and
signaling information indicative of the residual value.

17. The method of claim 16, wherein determining the size of the current block includes determining a width of the current block and a height of the current block are different sizes.

18. The method of claim 16, wherein the angle of the wide angle intra-prediction mode is less than −135 degrees or greater than to 45 degrees relative to the intra-predicted prediction sample.

19. The method of claim 16, further comprising:
determining one or more weights based on x- and y-coordinates of the intra-predicted prediction sample, wherein modifying the intra-predicted prediction sample comprises modifying the intra-predicted prediction sample to generate the modified prediction sample based on the one or more PDPC reference samples, the one or more weights, and the intra-predicted prediction sample.

20. The method of claim 16, wherein determining the one or more PDPC reference samples that are external to the current block comprises determining the one or more PDPC reference samples having both an x-coordinate and a y-coordinate that are different than both a respective x-coordinate and y-coordinate of the intra-predicted prediction sample in the prediction block.

21. The method of claim 16, wherein determining the one or more PDPC reference samples that are external to the current block comprises:

determining a row that is above the current block;
determining an x-coordinate in the determined row, wherein the x-coordinate in the determined row is equal to an x-coordinate of the intra-predicted prediction sample plus a y-coordinate of the intra-predicted prediction sample plus 1; and
determining a PDPC reference sample of the one or more PDPC reference samples based on the determined row and the determined x-coordinate.

22. The method of claim 16, wherein determining the one or more PDPC reference samples that are external to the current block comprises:
determining a column that is left of the current block;
determining a y-coordinate in the determined column, wherein the y-coordinate in the determined column is equal to a y-coordinate of the intra-predicted prediction sample plus an x-coordinate of the intra-predicted prediction sample plus 1; and
determining a PDPC reference sample of the one or more PDPC reference samples based on the determined column and the determined y-coordinate.

23. The method of claim 16, wherein determining the one or more PDPC reference samples that are external to the current block comprises:
determining a row that is above the current block;
determining an x-coordinate in the determined row, wherein the x-coordinate in the determined row is based on an angle of the wide angle intra-prediction mode relative to the intra-predicted prediction sample; and
determining a PDPC reference sample of the one or more PDPC reference samples based on the determined row and the determined x-coordinate.

24. The method of claim 23, wherein determining the x-coordinate in the determined row comprises:
determining one of a cotangent or tangent of the angle of the wide angle intra-prediction mode; and
determining the x-coordinate in the determined row based on one of the cotangent or tangent of the angle of the wide angle intra-prediction mode, an x-coordinate of the intra-predicted prediction sample, and a y-coordinate of the intra-predicted prediction sample.

25. The method of claim 16, wherein determining the one or more PDPC reference samples that are external to the current block comprises:
determining a column that is left of the current block;
determining a y-coordinate in the determined column, wherein the y-coordinate in the determined column is based on an angle of the wide angle intra-prediction mode; and
determining a PDPC reference sample of the one or more PDPC reference samples based on the determined column and the determined y-coordinate.

26. The method of claim 25, wherein determining the y-coordinate in the determined column comprises:
determining one of a cotangent or tangent of the angle of the wide angle intra-prediction mode; and
determining the y-coordinate in the determined column based on one of the cotangent or tangent of the angle of the wide angle intra-prediction mode, an x-coordinate of the intra-predicted prediction sample, and a y-coordinate of the intra-predicted prediction sample.

27. The method of claim 16, wherein determining the one or more PDPC reference samples that are external to the current block based on the wide angle intra-prediction mode comprises:

determining a set of one or more samples based on the wide angle intra-prediction mode; and at least one of interpolating, rounding with offset, or rounding without offset the set of one or more samples to generate the one or more PDPC reference samples.

28. The method of claim 16, wherein determining the one or more PDPC reference samples that are external to the current block based on the wide angle intra-prediction mode comprises:

determining that one or more samples external to the current block identified based on the wide angle intra-prediction mode are not stored in a reference line buffer; and determining the one or more PDPC reference samples based on a last PDPC reference sample stored in the reference line buffer.

29. The method of claim 16, wherein modifying the intra-predicted prediction sample of the plurality of intra-predicted prediction samples of the prediction block comprises modifying a first intra-predicted prediction sample of the prediction block, and wherein the one or more PDPC reference samples comprise a first set of one or more PDPC reference samples, the method further comprising:

determining, for a second intra-predicted prediction sample of the prediction block, that at least one PDPC reference sample of a second set of one or more PDPC reference samples for the second intra-predicted prediction sample are not stored in a reference line buffer; and one of not applying PDPC to the second intra-predicted prediction sample or applying PDPC using only PDPC reference samples available in reference line buffer.

30. The method of claim 16, wherein the wide angle intra-prediction mode is not a DC, planar, horizontal, or vertical intra-prediction mode.

31. A device for decoding video data, the device comprising:

a memory configured to store one or more prediction blocks; and a video decoder comprising at least one of fixed-function or programmable circuitry, wherein the video decoder is configured to:

determine a size of a current block of video data;

determine, based on the size of the current block, a wide angle intra-prediction mode to use for the current block;

determine a prediction block for the current block using the wide angle intra-prediction mode, the prediction block including a plurality of intra-predicted prediction samples determined using an angle of the wide angle intra-prediction mode;

determine one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;

modify, using the one or more PDPC reference samples, an intra-predicted prediction sample of the plurality of intra-predicted prediction samples of the prediction block to generate a modified prediction sample; and reconstruct a block based on the modified prediction sample and a residual value.

32. The device of claim 31, wherein determining the size of the current block includes determining a width of the current block and a height of the current block are different sizes.

33. The device of claim 31, wherein the angle of the wide angle intra-prediction mode is less than −135 degrees or greater than to 45 degrees relative to the intra-predicted prediction sample.

34. The device of claim 31, wherein the video decoder is configured to:

determine one or more weights based on x- and y-coordinates of the intra-predicted prediction sample, wherein modifying the intra-predicted prediction sample comprises modifying the intra-predicted prediction sample to generate the modified prediction sample based on the one or more PDPC reference samples, the one or more weights, and the intra-predicted prediction sample.

35. The device of claim 31, wherein determining the one or more PDPC reference samples that are external to the current block comprises determining the one or more PDPC reference samples having both an x-coordinate and a y-coordinate that are different than both a respective x-coordinate and y-coordinate of the intra-predicted prediction sample in the prediction block.

36. The device of claim 31, wherein determining the one or more PDPC reference samples that are external to the current block comprises:

determining a row that is above the current block;

determining an x-coordinate in the determined row, wherein the x-coordinate in the determined row is equal to an x-coordinate of the intra-predicted prediction sample plus a y-coordinate of the intra-predicted prediction sample plus 1; and determining a PDPC reference sample of the one or more PDPC reference samples based on the determined row and the determined x-coordinate.

37. The device of claim 31, wherein determining the one or more PDPC reference samples that are external to the current block comprises:

determining a column that is left of the current block;

determining a y-coordinate in the determined column, wherein the y-coordinate in the determined column is equal to a y-coordinate of the intra-predicted prediction sample plus an x-coordinate of the intra-predicted prediction sample plus 1; and determining a PDPC reference sample of the one or more PDPC reference samples based on the determined column and the determined y-coordinate.

38. The device of claim 31, wherein determining the one or more PDPC reference samples that are external to the current block comprises:

determining a row that is above the current block;

determining an x-coordinate in the determined row, wherein the x-coordinate in the determined row is based on an angle of the wide angle intra-prediction mode relative to the intra-predicted prediction sample; and determining a PDPC reference sample of the one or more PDPC reference samples based on the determined row and the determined x-coordinate.

39. The device of claim 38, wherein determining the x-coordinate in the determined row comprises:

determining one of a cotangent or tangent of the angle of the wide angle intra-prediction mode; and determining the x-coordinate in the determined row based on one of the cotangent or tangent of the angle of the wide angle intra-prediction mode, an x-coordinate of the intra-predicted prediction sample, and a y-coordinate of the intra-predicted prediction sample.

40. The device of claim 31, wherein determining the one or more PDPC reference samples that are external to the current block comprises:
   determining a column that is left of the current block;
   determining a y-coordinate in the determined column, wherein the y-coordinate in the determined column is based on an angle of the wide angle intra-prediction mode; and
   determining a PDPC reference sample of the one or more PDPC reference samples based on the determined column and the determined y-coordinate.

41. The device of claim 40, wherein determining the y-coordinate in the determined column comprises:
   determining one of a cotangent or tangent of the angle of the wide angle intra-prediction mode; and
   determining the y-coordinate in the determined column based on one of the cotangent or tangent of the angle of the wide angle intra-prediction mode, an x-coordinate of the intra-predicted prediction sample, and a y-coordinate of the intra-predicted prediction sample.

42. The device of claim 31, wherein determining the one or more PDPC reference samples that are external to the current block based on the wide angle intra-prediction mode comprises:
   determining a set of one or more samples based on the wide angle intra-prediction mode; and
   at least one of interpolating, rounding with offset, or rounding without offset the set of one or more samples to generate the one or more PDPC reference samples.

43. The device of claim 31, wherein determining the one or more PDPC reference samples that are external to the current block based on the wide angle intra-prediction mode comprises:
   determining that one or more samples external to the current block identified based on the wide angle intra-prediction mode are not stored in a reference line buffer; and
   determining the one or more PDPC reference samples based on a last PDPC reference sample stored in the reference line buffer.

44. The device of claim 31, wherein modifying the intra-predicted prediction sample of the plurality of intra-predicted prediction samples of the prediction block comprises modifying a first intra-predicted prediction sample of the prediction block, wherein the one or more PDPC reference samples comprise a first set of one or more PDPC reference samples, and wherein the video decoder is configured to:
   determine, for a second intra-predicted prediction sample of the prediction block, that at least one PDPC reference sample of a second set of one or more PDPC reference samples for the second intra-predicted prediction sample are not stored in a reference line buffer; and
   one of not apply PDPC to the second intra-predicted prediction sample or apply PDPC using only PDPC reference samples available in reference line buffer.

45. The device of claim 31, wherein the wide angle intra-prediction mode is not a DC, planar, horizontal, or vertical intra-prediction mode.

46. The device of claim 31, further comprising a display configured to display the current block.

47. The device of claim 31, wherein the device comprises one or more of a camera, a computer, a mobile device, a broadcast receiver device, or a set-top box.

48. A device of encoding video data, the device comprising:
   a memory configured to store one or more prediction blocks; and
   a video encoder comprising at least one of fixed-function or programmable circuitry, wherein the video encoder is configured to:
      determine a size of a current block of video data;
      determine, based on the size of the current block, a wide angle intra-prediction mode to use for the current block;
      determine a prediction block for the current block using the wide angle intra-prediction mode, the prediction block including a plurality of intra-predicted prediction samples determined using an angle of the wide angle intra-prediction mode;
      determine one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;
      modify, using the one or more PDPC reference samples, an intra-predicted prediction sample of the plurality of intra-predicted prediction samples of the prediction block to generate a modified prediction sample;
      determine a residual value for a residual block based on the modified prediction sample and a sample value in the current block; and
      signal information indicative of the residual value.

49. The device of claim 48, wherein determining the size of the current block includes determining a width of the current block and a height of the current block are different sizes.

50. The device of claim 48, wherein the angle of the wide angle intra-prediction mode is less than −135 degrees or greater than to 45 degrees relative to the intra-predicted prediction sample.

51. The device of claim 48, wherein the video encoder is configured to:
   determine one or more weights based on x- and y-coordinates of the intra-predicted prediction sample, wherein modifying the intra-predicted prediction sample comprises modifying the intra-predicted prediction sample to generate the modified prediction sample based on the one or more PDPC reference samples, the one or more weights, and the intra-predicted prediction sample.

52. The device of claim 48, wherein determining the one or more PDPC reference samples that are external to the current block comprises determining the one or more PDPC reference samples having both an x-coordinate and a y-coordinate that are different than both a respective x-coordinate and y-coordinate of the intra-predicted prediction sample in the prediction block.

53. The device of claim 48, wherein determining the one or more PDPC reference samples that are external to the current block comprises:

determining a row that is above the current block;
determining an x-coordinate in the determined row, wherein the x-coordinate in the determined row is equal to an x-coordinate of the intra-predicted prediction sample plus a y-coordinate of the intra-predicted prediction sample plus 1; and
determining a PDPC reference sample of the one or more PDPC reference samples based on the determined row and the determined x-coordinate.

54. The device of claim 48, wherein determining the one or more PDPC reference samples that are external to the current block comprises:
determining a column that is left of the current block;
determining a y-coordinate in the determined column, wherein the y-coordinate in the determined column is equal to a y-coordinate of the intra-predicted prediction sample plus an x-coordinate of the intra-predicted prediction sample plus 1; and
determining a PDPC reference sample of the one or more PDPC reference samples based on the determined column and the determined y-coordinate.

55. The device of claim 48, wherein determining the one or more PDPC reference samples that are external to the current block comprises:
determining a row that is above the current block;
determining an x-coordinate in the determined row, wherein the x-coordinate in the determined row is based on an angle of the wide angle intra-prediction mode relative to the intra-predicted prediction sample; and
determining a PDPC reference sample of the one or more PDPC reference samples based on the determined row and the determined x-coordinate.

56. The device of claim 55, wherein determining the x-coordinate in the determined row comprises:
determining one of a cotangent or tangent of the angle of the wide angle intra-prediction mode; and
determining the x-coordinate in the determined row based on one of the cotangent or tangent of the angle of the wide angle intra-prediction mode, an x-coordinate of the intra-predicted prediction sample, and a y-coordinate of the intra-predicted prediction sample.

57. The device of claim 48, wherein determining the one or more PDPC reference samples that are external to the current block comprises:
determining a column that is left of the current block;
determining a y-coordinate in the determined column, wherein the y-coordinate in the determined column is based on an angle of the wide angle intra-prediction mode; and
determining a PDPC reference sample of the one or more PDPC reference samples based on the determined column and the determined y-coordinate.

58. The device of claim 57, wherein determining the y-coordinate in the determined column comprises:
determining one of a cotangent or tangent of the angle of the wide angle intra-prediction mode; and
determining the y-coordinate in the determined column based on one of the cotangent or tangent of the angle of the wide angle intra-prediction mode, an x-coordinate of the intra-predicted prediction sample, and a y-coordinate of the intra-predicted prediction sample.

59. The device of claim 48, wherein determining the one or more PDPC reference samples that are external to the current block based on the wide angle intra-prediction mode comprises:
determining a set of one or more samples based on the wide angle intra-prediction mode; and
at least one of interpolating, rounding with offset, or rounding without offset the set of one or more samples to generate the one or more PDPC reference samples.

60. The device of claim 48, wherein determining the one or more PDPC reference samples that are external to the current block based on the wide angle intra-prediction mode comprises:
determining that one or more samples external to the current block identified based on the wide angle intra-prediction mode are not stored in a reference line buffer; and
determining the one or more PDPC reference samples based on a last PDPC reference sample stored in the reference line buffer.

61. The device of claim 48, wherein modifying the intra-predicted prediction sample of the plurality of intra-predicted prediction samples of the prediction block comprises modifying a first intra-predicted prediction sample of the prediction block, wherein the one or more PDPC reference samples comprise a first set of one or more PDPC reference samples, and wherein the video encoder is configured to:
determine, for a second intra-predicted prediction sample of the prediction block, that at least one PDPC reference sample of a second set of one or more PDPC reference samples for the second intra-predicted prediction sample are not stored in a reference line buffer; and
one of not apply PDPC to the second intra-predicted prediction sample or apply PDPC using only PDPC reference samples available in reference line buffer.

62. The device of claim 48, wherein the wide angle intra-prediction mode is not a DC, planar, horizontal, or vertical intra-prediction mode.

63. The device of claim 48, wherein the device comprises one or more of a camera, a computer, a mobile device, a broadcast receiver device, or a set-top box.

64. A computer-readable storage medium storing instructions that when executed cause one or more processors of a device for decoding video data to:
determine a size of a current block of video data;
determine, based on the size of the current block, a wide angle intra-prediction mode to use for the current block;
determine a prediction block for the current block using the wide angle intra-prediction mode, the prediction block including a plurality of intra-predicted prediction samples determined using an angle of the wide angle intra-prediction mode;
determine one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;
modify, using the one or more PDPC reference samples, an intra-predicted prediction sample of the plurality of intra-predicted prediction samples of the prediction block to generate a modified prediction sample; and
reconstruct a current block based on the modified prediction sample and a residual value.

65. A computer-readable storage medium storing instructions that when executed cause one or more processors of a device for encoding video data to:
- determine a size of a current block of video data;
- determine, based on the size of the current block, a wide angle intra-prediction mode to use for the current block;
- determine a prediction block for the current block using the wide angle intra-prediction mode, the prediction block including a plurality of intra-predicted prediction samples determined using an angle of the wide angle intra-prediction mode;
- determine one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;
- modify, using the one or more PDPC reference samples, an intra-predicted prediction sample of the plurality of intra-predicted prediction samples of the prediction block to generate a modified prediction sample;
- determine a residual value for a residual block based on the modified prediction sample and a sample value in the current block; and
- signal information indicative of the residual value.

66. A device for decoding video data, the device comprising:
- means for determining a size of a current block of video data;
- means for determining, based on the size of the current block, a wide angle intra-prediction mode to use for the current block;
- means for determining a prediction block for the current block using the wide angle intra-prediction mode, the prediction block including a plurality of intra-predicted prediction samples determined using an angle of the wide angle intra-prediction mode;
- means for determining one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;
- means for modifying, using the one or more PDPC reference samples, an intra-predicted prediction sample of the plurality of intra-predicted prediction samples of the prediction block to generate a modified prediction sample; and
- means for reconstructing a block based on the modified prediction sample and a residual value.

67. A device for encoding video data, the device comprising:
- means for determining a size of a current block of video data;
- means for determining, based on the size of the current block, a wide angle intra-prediction mode to use for the current block;
- means for determining a prediction block for the current block using the wide angle intra-prediction mode, the prediction block including a plurality of intra-predicted prediction samples determined using an angle of the wide angle intra-prediction mode;
- means for determining one or more Position Dependent Intra Prediction Combination (PDPC) reference samples that are external to the current block for modifying the plurality of intra-predicted prediction samples of the prediction block, wherein each PDPC reference sample of the one or more PDPC reference samples are determined using the angle of the wide angle intra-prediction mode relative to a respective intra-predicted prediction sample of the plurality of intra-predicted prediction samples;
- means for modifying, using the one or more PDPC reference samples, an intra-predicted prediction sample of the plurality of intra-predicted prediction samples of the prediction block to generate a modified prediction sample;
- means for determining a residual value for a residual block based on the modified prediction sample and a sample value in the current block; and
- means for signaling information indicative of the residual value.

* * * * *